United States Patent
Shimamura et al.

(10) Patent No.: US 11,718,976 B2
(45) Date of Patent: Aug. 8, 2023

(54) CONTROL APPARATUS, WORK MACHINE, CONTROL METHOD, AND COMPUTER READABLE STORAGE MEDIUM

(71) Applicant: HONDA MOTOR CO.,LTD., Tokyo (JP)

(72) Inventors: Hideaki Shimamura, Saitama (JP); Keiji Muro, Saitama (JP); Naoki Kameyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 340 days.

(21) Appl. No.: 16/985,173

(22) Filed: Aug. 4, 2020

(65) Prior Publication Data
US 2020/0362536 A1 Nov. 19, 2020

Related U.S. Application Data

(63) Continuation of application No. PCT/JP2018/007654, filed on Feb. 28, 2018.

(51) Int. Cl.
*E02F 9/20* (2006.01)

(52) U.S. Cl.
CPC .......... *E02F 9/2045* (2013.01); *E02F 9/2062* (2013.01); *E02F 9/2087* (2013.01); *E02F 9/2054* (2013.01)

(58) Field of Classification Search
CPC .. A01B 69/008; A01B 79/005; A01D 34/008; E02F 9/2045; E02F 9/2054; E02F 9/2062; E02F 9/2087; G01S 19/14; G01S 5/16; G01C 21/3461; G05D 1/0274; G05D 2201/0208
See application file for complete search history.

(56) References Cited

U.S. PATENT DOCUMENTS

| | | | | |
|---|---|---|---|---|
| 7,386,163 B2* | 6/2008 | Sabe | ...................... | G06V 20/10 |
| | | | | 348/42 |
| 7,539,557 B2* | 5/2009 | Yamauchi | .............. | G05D 1/027 |
| | | | | 700/262 |
| 7,573,403 B2* | 8/2009 | Goncalves | ........... | G05D 1/0234 |
| | | | | 340/988 |

(Continued)

FOREIGN PATENT DOCUMENTS

| | | |
|---|---|---|
| CN | 107333245 A | 11/2017 |
| JP | 2011065308 A | 3/2011 |

(Continued)

OTHER PUBLICATIONS

International Preliminary Report on Patentability for International Application No. PCT/JP2018/007654, issued by the International Bureau of WIPO dated Sep. 1, 2020.

(Continued)

*Primary Examiner* — Tyler J Lee

(57) ABSTRACT

A moving efficiency of a work machine decreases if an obstacle, an entrance prohibiting region, and the like are arranged inside a region, if a positioning precision of the work machine is relatively low, and the like. A control apparatus includes a control section to control a movement of a moving object based on at least one of a completion level of map information indicating a region where a moving object is permitted to enter and a location estimation precision of a moving object.

18 Claims, 17 Drawing Sheets

(56) References Cited

U.S. PATENT DOCUMENTS

| | | | | |
|---|---|---|---|---|
| 7,761,231 B2* | 7/2010 | Kawabe | B25J 19/021 | |
| | | | 356/3 | |
| 8,180,486 B2* | 5/2012 | Saito | G06N 3/008 | |
| | | | 701/461 | |
| 8,442,714 B2* | 5/2013 | Matsukawa | G05D 1/0238 | |
| | | | 701/28 | |
| 8,897,947 B2* | 11/2014 | Nakano | G05D 1/0238 | |
| | | | 701/25 | |
| 9,164,512 B2* | 10/2015 | Oobayashi | G05D 1/024 | |
| 9,182,762 B2* | 11/2015 | Yabushita | G05D 1/0246 | |
| 9,475,195 B2* | 10/2016 | Sisbot | B25J 9/1676 | |
| 2007/0027579 A1* | 2/2007 | Suzuki | G05D 1/12 | |
| | | | 700/245 | |
| 2007/0219667 A1* | 9/2007 | Jung | G05D 1/0274 | |
| | | | 700/245 | |
| 2009/0043440 A1* | 2/2009 | Matsukawa | G05D 1/0238 | |
| | | | 701/25 | |
| 2010/0013615 A1* | 1/2010 | Hebert | G06T 7/74 | |
| | | | 340/425.5 | |
| 2010/0049365 A1* | 2/2010 | Jones | B25J 9/1694 | |
| | | | 901/1 | |
| 2010/0198443 A1* | 8/2010 | Yabushita | G05D 1/0274 | |
| | | | 701/25 | |
| 2012/0035797 A1* | 2/2012 | Oobayashi | G05D 1/024 | |
| | | | 701/25 | |
| 2012/0283905 A1* | 11/2012 | Nakano | G05D 1/0238 | |
| | | | 701/25 | |
| 2014/0297090 A1 | 10/2014 | Ichinose | | |
| 2016/0278287 A1 | 9/2016 | Kasai | | |
| 2017/0017235 A1 | 1/2017 | Tanaka | | |
| 2017/0150676 A1 | 6/2017 | Yamauchi | | |
| 2017/0220044 A1 | 8/2017 | Sakai | | |
| 2017/0364081 A1 | 12/2017 | Albaghajati | | |
| 2019/0025057 A1 | 1/2019 | Sakai | | |
| 2020/0117185 A1 | 4/2020 | Fu | | |

FOREIGN PATENT DOCUMENTS

| | | |
|---|---|---|
| JP | 2013223531 A | 10/2013 |
| JP | 2016185099 A | 10/2016 |
| JP | 2017134794 A | 8/2017 |
| JP | 2017191539 A | 10/2017 |
| WO | 2013069147 A1 | 5/2013 |
| WO | 2016093374 A1 | 6/2016 |
| WO | 2017149628 A1 | 9/2017 |

OTHER PUBLICATIONS

Extended European Search Report for counterpart European Application No. 18907508.8, issued by the European Patent Office dated Nov. 16, 2020.

Office Action issued for counterpart Japanese Application No. 2016-150949, issued by the Japan Patent Office dated Apr. 6, 2021 (drafted on Apr. 1, 2021).

* cited by examiner

| 1500 | | | | | | | | | |
|---|---|---|---|---|---|---|---|---|---|
| TIME | LOCATION | | | | POSTURE | | | BOUNDARY DETECTION | PROXIMITY DETECTION | GROUND CONDITION | DETAIL OF WORK |
| | x | y | z | PRE-CISION | ROLL | PITCH | YAW | | | | |

| LOCATION | | | IDENTIFICATION INFORMATION OF UNIT REGION | EVALUATION | | |
|---|---|---|---|---|---|---|
| x | y | z | | PERMISSION OF ENTRANCE | ATTRIBUTION OF WORK TARGET | MEASUREMENT PRECISION |

1600

CONTROL APPARATUS, WORK MACHINE, CONTROL METHOD, AND COMPUTER READABLE STORAGE MEDIUM

The contents of the following international application are incorporated herein by reference:
NO. PCT/JP2018/007654 filed on Feb. 28, 2018.

BACKGROUND

1. Technical Field

The present invention relates to a control apparatus, a work machine, a control method, and a computer readable storage medium.

2. Related Art

In recent years, a work machine has been developed which autonomously travels inside a predetermined region to perform various types of works (for example, see Patent document 1 or 2).

PRIOR ART DOCUMENT

Patent Document

[Patent document 1] Japanese Unexamined Patent Application, Publication No. 2016-185099
[Patent document 2] Japanese Unexamined Patent Application, Publication No. 2013-223531

The summary clause does not necessarily describe all necessary features of the embodiments of the present invention. The present invention may also be a sub-combination of the features described above.

BRIEF DESCRIPTION OF THE DRAWINGS

FIG. 15 schematically shows one example of the data table 1500.
FIG. 16 schematically shows one example of the data table 1600.

DESCRIPTION OF EXEMPLARY EMBODIMENTS

Hereinbelow, the present invention will be described through embodiments of the invention, but the following embodiments do not limit the invention disclosed in claims. In addition, not all combinations of features described in the embodiments are necessarily essential to the solution of the invention. Identical or similar portions in figures are given identical reference numbers, and the same explanation is omitted in some cases.

[Outline of the Moving Object 150]

Figure 1:
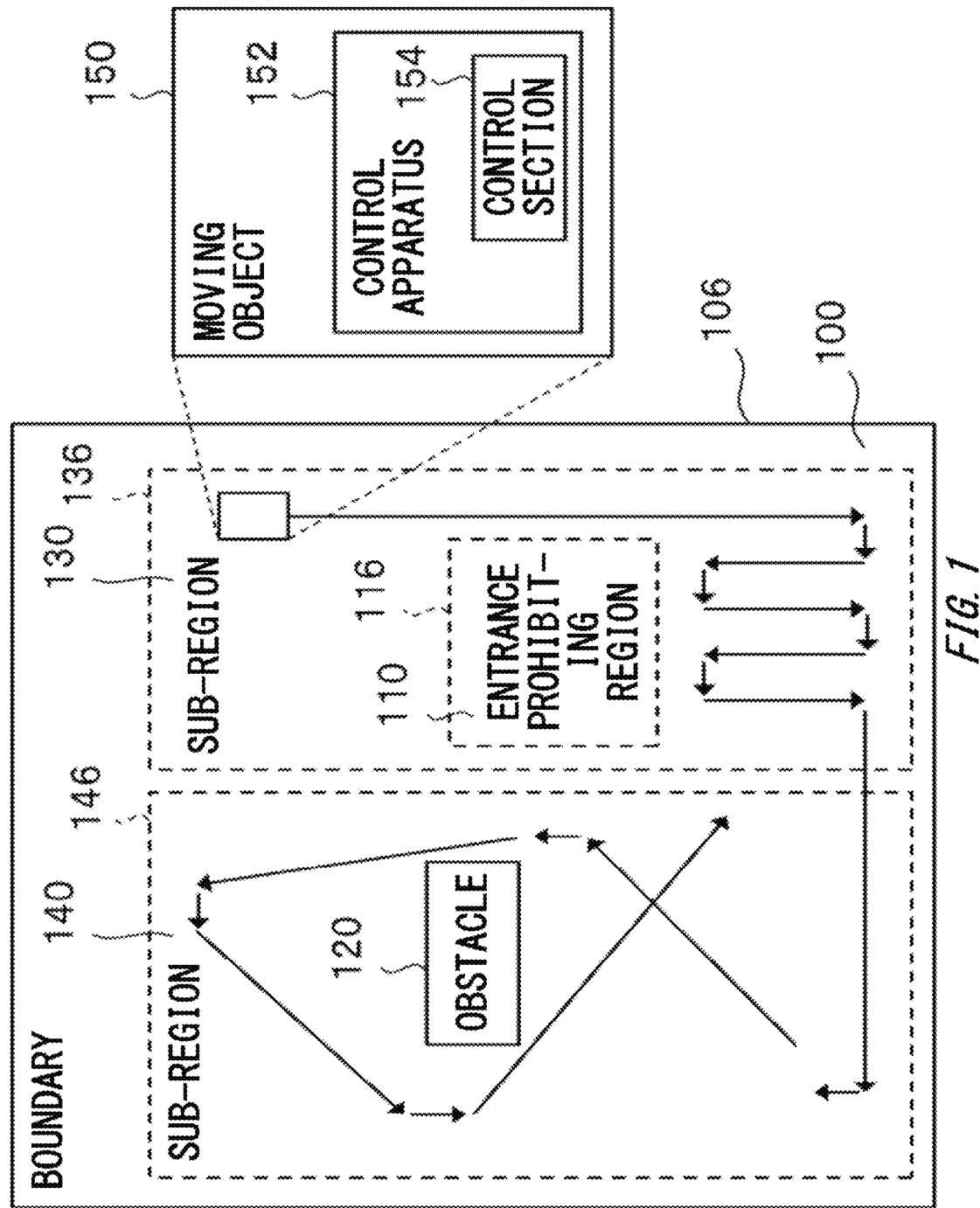
FIG. 1 schematically shows one example of the internal configuration of the moving object 150.

FIG. 1 schematically shows one example of the internal configuration of the moving object 150 in one embodiment. In the present embodiment, the moving object 150 includes the control apparatus 152. In the present embodiment, the control apparatus 152 has the control section 154. The moving object 150 may be one example of the work machine.

In the present embodiment, the moving object 150 has an autonomous movement function. For example, the moving object 150 can move by an automatic driving by the control apparatus 152. The moving object 150 may move by a remote control from the user. The moving object 150 may be a moving object which travels on the ground, may be a moving object flying in the air, or a moving object navigating under water or on water.

In the present embodiment, the moving object 150 moves inside the region 100. In the present embodiment, (i) the entrance prohibiting region 110 where the moving object 150 is prohibited from entering and (ii) the obstacle 120 which prevents the moving object 150 from entering are arranged inside the region 100. A plurality of the entrance prohibiting regions 110 may be arranged inside the region 100. A plurality of the obstacles 120 is arranged inside the region 100.

In the present embodiment, inside the region 100, the moving object 150 is permitted to move a region except (i) the entrance prohibiting region 110 and (ii) the region where the obstacle 120 is arranged. The region 100 may be one example of a region where the moving object 150 is permitted to enter.

In the present embodiment, the region 100 may be a region surrounded by the boundary 106. The boundary 106 may have a line shape or may have a band shape with a width wider than that of the line boundary. The boundary 106 distinguishes the inside of the region 100 and the outside of the region 100. The boundary 106 may be a geographical boundary which is physically set or may be a geographical boundary which is virtually set. The boundary 106 may be constituted of a single continuous boundary or may be constituted of a combination of a plurality of boundaries.

In the present embodiment, the entrance prohibiting region 110 may be a region surrounded by the boundary 116. The boundary 116 may have a line shape or may have a band shape with a width wider than that of the line boundary. The boundary 116 distinguishes a region where the moving object 150 is permitted to enter inside the region 100 and a region where the moving object 150 is prohibited from entering inside the region 100. The boundary 116 may be a geographical boundary which is physically set or may be a geographical boundary which is virtually set. The boundary 116 may be constituted of a single continuous boundary or may be constituted of a combination of a plurality of boundaries.

Examples of a geographical boundary which is physically set include (i) a boundary defined by a structural body which is naturally or artificially formed, (ii) a boundary defined by a sprayed chemicals, (iii) a boundary defined by electromagnetic wave such as visible light, infrared light, ultraviolet light, and the like, (iv) a boundary defined by magnetic field, (v) a boundary defined by sound wave or ultrasonic wave, and the like. Examples of a structure formed naturally include a dip, a step, a slope, lake and reservoir, river, and the like. Examples of a structural body formed artificially include a passage, a groove, a tunnel, a building, wire, a rope, a fence, a net, a Braille block, and the like. Examples of a geographical boundary which is set virtually include a geofence, a virtual wire, and the like. The virtual wire may be a geographical boundary defined by a virtual line set among a plurality of structures.

In the present embodiment, the obstacle 120 prevents the moving object 150 from advancing. The obstacle 120 may be an object which is difficult for the moving object 150 to safely pass through relative to the movement performance of the moving object 150. The obstacle 120 distinguishes a region where the moving object 150 is permitted to enter inside the region 100 and a region where the moving object 150 is prohibited from entering inside the region 100. The obstacle 120 may be one example of the boundary.

The obstacle 120 may be a structural body which is naturally or artificially formed. Examples of the structural body which is naturally formed include a tree, a rock, mud, lake and pond, a dip, a step, a steep slope, and the like. Examples of a structural body which is artificially formed include a block, a building, a groove, wire, rope, fence, net, and the like.

In the present embodiment, the region 100 may have one or more sub-regions 130 and one or more sub-regions 140 therein. The sub-region 130 and the sub-region 140 may be one example of a region where the moving object 150 is permitted to enter.

In the present embodiment, the entrance prohibiting region 110 is arranged inside the sub-region 130 and the obstacle 120 is arranged inside the sub-region 140. However, the sub-region 130 and the sub-region 140 is not limited to the present embodiment. In another embodiment, the obstacle 120 is arranged inside the sub-region 130 and the entrance prohibiting region 110 is arranged inside the sub-region 140.

The sub-region 130 and the sub-region 140 may be a virtual region used for the control apparatus 152 to control the moving object 150. At least one of the location, size, and shape of the sub-region 130 may change over time, or may not change over time. The sub-region 130 may be a region surrounded by the boundary 136. The boundary 136 may be a geographical boundary which is virtually set. At least one of the location, size, and shape of the sub-region 140 may change over time, or may not change over time. The sub-region 140 may be a region surrounded by the boundary 146. The boundary 146 may be a geographical boundary which is virtually set.

The sub-region 130 may be a region where a value of a first parameter in the region satisfies a certain particular condition related to the first parameter. The sub-region 140 may be a region where a value of a first parameter in the region does not satisfy the above-described particular condition related to the first parameter. Examples of the first parameter include (i) a completion level of the map information indicating a region where the moving object 150 is permitted to enter, (ii) an estimation precision of the self-location of the moving object 150, and the like.

The sub-region 140 may be a region where a value of a first parameter in the region satisfies another condition related to the first parameter. The sub-region 140 may be a region where a value of a second parameter in the region satisfies the condition related to the second parameter. The second parameter may be a parameter different from the first parameter.

In the present embodiment, the control apparatus 152 controls the moving object 150. In the present embodiment, the control apparatus 152 is described in detail using a case in which the control apparatus 152 is arranged in the moving object 150, as an example. However, the control apparatus 152 is not limited to the present embodiment. In another embodiment, the control apparatus 152 may be at least a part of the external information processing apparatus which can transmit and receive information with the moving object 150 via the communication network, or may be realized by the information processing apparatus.

In the present embodiment, the control section 154 controls the moving object 150. The control section 154 may control the movement of the moving object 150. The control section 154 may control the movement of the moving object 150 based on at least one of (i) the completion level of the map information indicating the region where the moving object 150 is permitted to enter and (ii) the location estimation precision of the moving object 150.

For example, the control section 154 controls at least one of (i) the advancing speed and (ii) the advancing direction of the moving object 150. The control section 154 may control the operation when the moving object 150 reaches at least one of the boundary 106, the boundary 116, the obstacle 120, the boundary 136, and the boundary 146. The control section 154 may control an advancing direction of the moving object 150 by controlling the operation when the moving object 150 reaches at least one of the boundary 106, the boundary 116, the obstacle 120, the boundary 136, and the boundary 146. The control section 154 may control the operation when the moving object 150 returns to the return destination of the moving object 150 from any locations inside the region 100.

In one embodiment, the control section 154 controls the movement of the moving object 150 such that at least one of (i) the advancing speed of the moving object 150 and (ii) the operation performed when the moving object 150 reaches any boundaries are different between (a) in the case in which the completion level of the map information at the location of the moving object 150 satisfies a predetermined first condition and (b) in the case in which the completion level of the map information at the location of the moving object 150 satisfies a predetermined second condition. The second condition may be a condition different from the first condition. The second condition may be a condition that the completion level of the map information does not satisfy the first condition.

For example, if a completion level of the map information at the location of the moving object 150 satisfies the first condition, the control section 154 (i) sets a set value of the advancing speed of the moving object 150 to a value smaller than that in a case when a completion level of the map information satisfies the second condition and (ii) determines the advancing direction of the moving object 150 based on the probability model when the moving object 150 reaches any boundaries. When a completion level of the map information at the location of the moving object satisfies the first condition, the control section 154 may control the movement of the moving object 150 such that the moving object 150 returns to the return destination of the moving object 150 along the boundary 106 of the region 100.

In another embodiment, the control section 154 controls the movement of the moving object 150 such that at least one of (i) the advancing speed of the moving object 150 and (ii) the operation performed when the moving object 150 reaches the boundary of the region are different between (a) in the case when the location estimation precision of the moving object 150 satisfies a predetermined third condition and (b) in the case when the location estimation precision of the moving object 150 satisfies the predetermined fourth condition. Each of the third condition and the fourth condition may be a condition different from the first condition and the second condition. The fourth condition may be a condition different from the third condition. The fourth condition may be a condition that the location estimation precision of the moving object 150 does not satisfy the third condition.

For example, if the location estimation precision of the moving object 150 satisfies the third condition, the control section 154 (i) sets a set value of the advancing speed of the moving object 150 to a value smaller than that in a case when the location estimation precision of the moving object 150 satisfies the fourth condition and (ii) determines the advancing direction of the moving object 150 based on the probability model when the moving object 150 reaches any boundaries. If the location estimation precision of the moving object 150 satisfies the third condition, the control section 154 controls the movement of the moving object 150 such that the moving object 150 returns to the return destination of the moving object 150 along the boundary 106 of the region 100.

In the present embodiment, the control section 154 may control the moving object 150 by determining the movement mode of the moving object 150 according to the status of the moving object 150. For example, the control section 154 determines the movement mode of the moving object 150 based on at least one of (i) the completion level of the map information and (ii) the location estimation precision of the moving object 150.

The movement mode may be the information to define at least one of (i) settings related to at least one of the advancing speed and the advancing direction and (ii) the algorithm to determine at least one of the advancing speed and the advancing direction. For example, the advancing direction of the moving object 150 is determined based on the operation of the moving object 150 in a case when the moving object 150 reaches any boundaries. Examples of any boundaries include the boundary 106 of the region 100, the boundary 116 of the entrance prohibiting region 110, the contour of the obstacle 120, the boundary 136 of the sub-region 130, the boundary 146 of the sub-region 140, and the like.

As one example of the movement mode, (i) the mode in which any works are performed on a work target arranged inside the region 100 when the moving object 150 is in motion, (ii) the mode in which the map information is created without the above-described work being performed when the moving object 150 is in motion, (iii) the mode in which the map information is created with the above-described work being performed when the moving object 150 is in motion, (iv) the mode in which the moving object 150 in motion simply moves without the above-described work being performed or without the map information being created, (v) the mode in which the moving object 150 moves while suppressing the generation of the noise, (vi) the mode in which the moving object 150 returns to the return destination, and the like are exemplified. For example, the above-described movement mode defines at least one of the settings related to the advancing speed and the algorithm to determine the advancing speed. The above-described movement mode may further define the operation performed when the moving object 150 reaches any boundaries.

Other examples of the movement mode include (i) the mode in which the moving object 150 moves along a predetermined path (also referred to as program mode in some cases), (ii) the mode in which the moving object 150 moves along a known boundary after it reaches the boundary (also referred to as guide mode in some cases), (iii) the mode in which the moving object 150 detects the location, size, and range or shape of the boundary while it moves around any boundaries after it reaches the boundary (also referred to as shape detection mode in some cases), (iv) the mode in which the moving object 150 turns to the direction determined based on any probability model after it reaches any boundary, and continues to move (also referred to as first random mode in some cases), (v) the mode in which the moving object 150 turns to the determined direction based on any probability model with a constraint condition after it reaches any boundaries (also referred to as second random mode in some cases), and continues to move, (vi) the mode in which the moving object 150 moves while repeating straight moving and turning such that a plurality of parallel paths is arranged without a gap or with a predetermined gap (also referred to as parallel mode in some cases), and the like. Examples of the shape of a path in the parallel mode include a straight line, a curved line, zigzag, and a combination thereof. For example, the above-described movement mode defines the operation of the moving object 150 performed when the moving object 150 reaches any boundaries. The above-described movement mode may further define at least one of settings related to the advancing speed and the algorithm to determine the advancing speed.

In the present embodiment, the control section 154 obtains the data to generate the map information indicating the region where the moving object 150 is permitted to enter (also referred to as log data in some cases) while moving inside the region 100. The control section 154 may generate the map information based on the obtained log data.

The control section 154 may determine whether to obtain the log data based on the location of the moving object 150. For example, if the completion level of the map information at a location of the moving object 150 is equal to or higher than a predetermined threshold or exceeds the threshold, the control section 154 determines not to obtain the log data at the location. The control section 154 may determine whether to obtain the log data based on the estimation precision of the location of the moving object 150. For example, if the above-described location estimation precision is equal to or lower than a predetermined threshold or is less than the threshold, the control section 154 determines not to obtain the log data at the location.

For a particular region, if the map information is created for the first time, the completion level of the map information may be defined as the ratio of the region where the creation work of the map information ends to the whole particular region. In addition, if the map information is updated, the completion level of the map information may be defined as a completion level of the update work. For example, the completion level of the map information is defined as a ratio of the region where the update work of the map information has end to the region which is a target of the update work of the map information.

In one embodiment, for each of a plurality of sub-regions generated by virtually dividing the region 100, the completion level of the map information in the sub-region is calculated. The shape and size of each sub-region are not specifically limited. For example, the completion level of the map information in each sub-region is determined based on at least one of (i) the number of log data already obtained inside the sub-region, (ii) the geographic distribution of the log data already obtained inside the sub-region, and (iii) the ratio of the area of the region through which the moving object 150 has already passed inside the sub-region to the area of the sub-region.

In this case, the control section 154 may use, as the completion level of the map information of the moving object 150 located inside a particular sub-region, the completion level of the map information in the sub-region. If the moving object 150 is located on the boundary of the sub-region, the control section 154 may determine the sub-region where the moving object 150 is located based on the advancing direction of the moving object 150.

In another embodiment, the completion level of the map information is calculated for each location of the moving object 150. In the above-described embodiment, the location, size, and shape of each of a plurality of sub-regions are predetermined and the completion level of the map information is calculated for each sub-region. In contrast, according to the present embodiment, when the location of the moving object 150 is specified, a virtual region to calculate the completion level of the map information (also referred to as calculation region in some cases) is set around the moving object 150.

The calculation region may be set such that the moving object 150 is included inside the calculation region or may be set at a location far from the moving object 150. The calculation region may be set in any locations on the advancing direction of the moving object 150. The shape and size of the calculation region and the location of the moving object 150 in the calculation region are not specifically limited.

For example, the completion level of the map information is determined based on at least one of (i) the number of log data already obtained inside the calculation region, (ii) the geographic distribution of the log data already obtained inside the calculation region, (iii) the shortest distance between the location indicated by the log data already obtained inside the calculation region and the location of the moving object 150, (iv) the ratio of the area of the region through which the moving object 150 has already passed inside a calculation region to the area of the calculation region. It is noted that the completion level of the map information may be calculated based on the shortest distance between the location indicated by the log data which has been already obtained and the location of the moving object 150 without the calculation region being set.

The completion level of the map information may be represented with consecutive values or may be represented with a stepwise segmentation. Examples of the evaluation according to the stepwise segmentation include a two-step evaluation, a three-step evaluation, a five step evaluation, a 10 step evaluation, and the like. Each segment may be distinguished with symbols or characters, or may be distinguished with numbers.

The control section 154 may obtain the above-described data for each predetermined time interval. The control section 154 may obtain the above-described data at a predetermined time. The control section 154 may obtain the above-described data each time the moving object 150 moves a predetermined distance. The control section 154 may obtain the above-described data when the moving object 150 reaches a predetermined location. The control section 154 may obtain the above-described data when the surrounding environment of the moving object 150 satisfies the predetermined condition.

For example, when the moving object 150 is moving inside the region 100, the control section 154 associates the information indicating a location of the moving object 150 and the information indicating whether or not the moving object 150 can advance at the location and stores them in any storage apparatus. When the moving object 150 is moving inside the region 100, the control section 154 may associate the information indicating a location of the moving object 150, the information indicating the advancing direction of the moving object 150 in the location, and the information indicating whether or not the moving object 150 can advance at the location and store them in any storage apparatus.

The control section 154 may estimate the location of the moving object 150 with any location estimation method. The control section 154 may estimate a location of the moving object 150 and also determine the estimation precision of the location (also referred to as positioning precision in some cases).

In one embodiment, the control section 154 estimates the location of the moving object 150 based on a GPS signal. The GPS signal may include the information indicating the positioning precision. In another embodiment, the control section 154 estimates the location of the moving object 150 based on the beacon signal from a beacon emitter placed inside or around the region 100. In another embodiment, the control section 154 estimates the location of the moving object 150 based on the radio wave intensity of the wireless radio wave from a plurality of radio wave emitters. In yet another embodiment, the control section 154 analyzes the image around the moving object 150 to estimate the location of the moving object 150.

According to the present embodiment, for example, the control section 154 controls the movement of the moving object 150 based on at least one of (i) the completion level of the map information and (ii) the location estimation precision of the moving object 150. Thereby, the moving object 150 can move efficiently inside the region 100.

For example, according to a prior art, the working machine creates the map information while it is moving in a parallel mode with a slow speed inside the work region. Therefore, the duration needed to complete the map information is long and it is difficult for a working machine to move at high speed inside a work region until the map information is completed.

In contrast, according to the present embodiment, the control section 154 controls the movement of the moving object 150 according to the completion level of the map information. For example, the control section 154 controls the moving object 150 such that (i) the moving object 150 travels with an appropriate movement mode and a movement speed according to the purpose in a region where the completion level of the map information is relatively high and (ii) the moving object 150 travels with a movement mode and a movement speed which prefer the creation of the map information in a region where the completion level of the map information is relatively low. Thereby, the duration needed to complete the map information can be reduced.

In addition, according to the present embodiment, the moving object 150 can create the map information even while it moves with a first random mode or a second random mode in at least a part of the region 100. Therefore, the duration needed for the approximate locations of the entrance prohibiting region 110, the obstacle 120 and the like to be reflected in the map information can be reduced. As a result, the control section 154 can allow the moving object 150 to move at high speed in a region where the completion level of the map information is relatively high, even before the map information is completed. Thereby, the moving object 150 can move efficiently inside the region 100.

In addition, according to the present embodiment, the control section 154 controls the movement of the moving object 150 according to the location estimation precision of the moving object 150. For example, the control section 154 controls the moving object 150 such that (i) the moving object 150 travels with an appropriate movement mode and a movement speed according to the purpose in a region where the location estimation precision is relatively high and (ii) the moving object 150 travels with a first random mode or a second random mode in a region where the location estimation precision is relatively low. Thereby, the moving object 150 can move efficiently inside the region 100.

[Specific Configuration of Each Section of Moving Object 150]

Each section of the moving object 150 may be realized by hardware, software, or hardware and software. If at least some of components constituting the moving object 150 are realized by software, the components realized by the software may be realized by activating, in an information processing apparatus having a general configuration, software or a program stipulating operations about the components.

The above-described information processing apparatus may include: (i) a data processing apparatus having processors such as a CPU or a GPU, a ROM, a RAM, a communication interface and the like, (ii) input apparatuses such as a keyboard, touch panel, camera, microphone, various types of sensors or GPS receiver, (iii) output apparatuses such as a display apparatus, a speaker or a vibration apparatus, and (iv) storage apparatuses (including external storage apparatuses) such as a memory or a HDD. In the above-described information processing apparatus, the above-described data processing apparatus or storage apparatus may store the above-described software or program. Upon being executed by a processor, the above-described software or program causes the above-described information processing apparatus to execute operations stipulated by the software or program. The above-described software or the program described above may also be stored in a non-transitory computer readable recording medium.

The above-described software or program may be a control program to control the moving object having an autonomous movement function. The control program may be a program to enable a computer to perform a control step to control the movement of the moving object based on at least one of the completion level of the map information indicating the permission or prohibition of entrance at each location inside the region where the moving object is permitted to enter and the location estimation precision of the moving object. The above-described computer may be (i) the computer mounted on the moving object 150, or may be (ii) the computer to control the moving object 150 via the communication network, wherein the computer is outside the moving object 150.

[Outline of the Management System 200]

Figure 2:
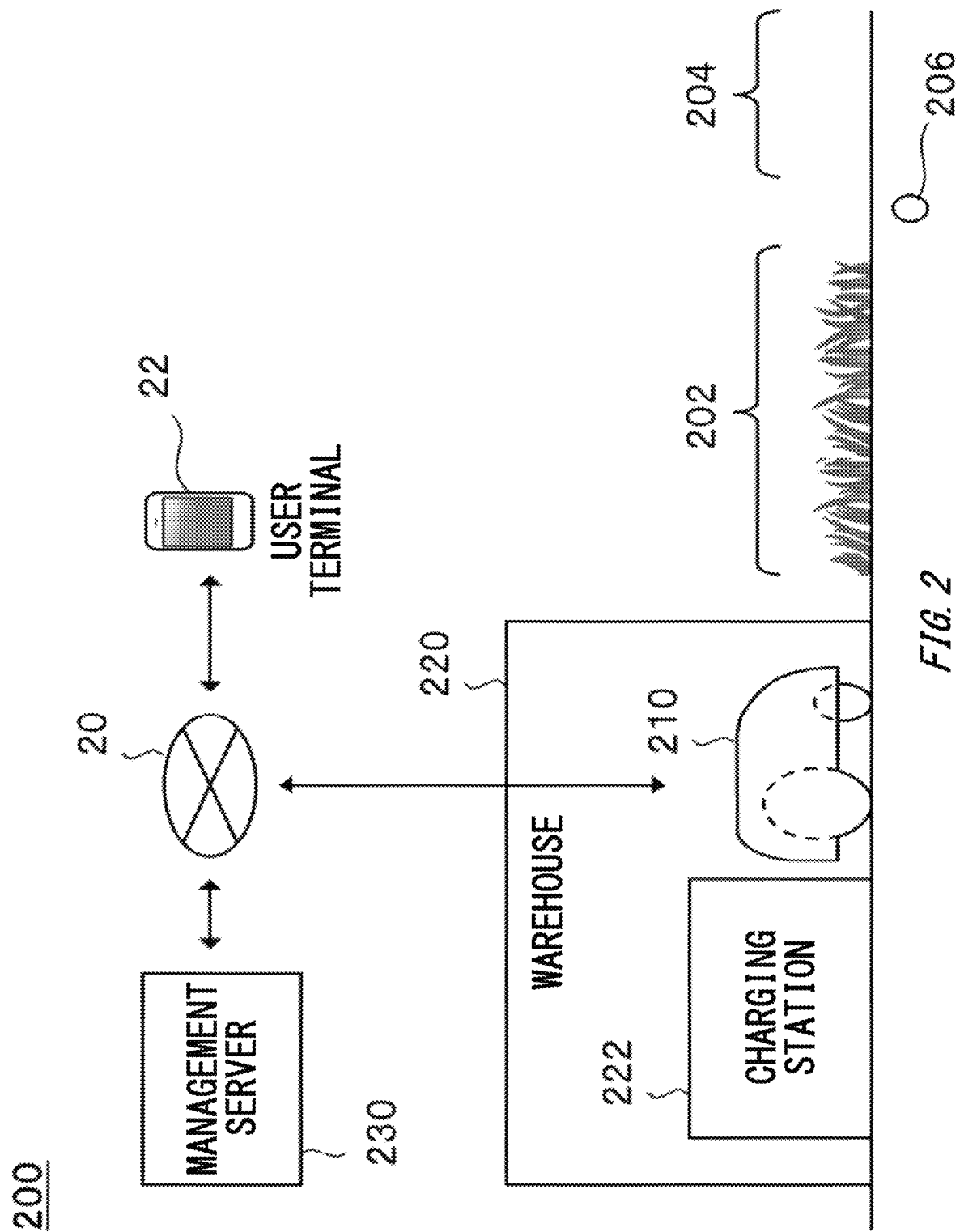
FIG. 2 schematically shows one example of the system configuration of the management system 200.

FIG. 2 schematically shows one example of the system configuration of the management system 200. In the present embodiment, the management system 200 includes the lawn mower 210, the warehouse 220, and the management server 230. In the present embodiment, the charging station 222 is arranged in the warehouse 220.

The lawn mower 210 is one example of the moving object and the work machine. A part of the lawn mower 210 may be one example of the control section and the control apparatus. The warehouse 220 may be one example of the return destination. The user terminal 22 may be one example of the control section and the control apparatus. The management server 230 may be one example of the control section and the control apparatus.

Each section of the management system 200 may transmit and receive information with each other. For example, the lawn mower 210 transmits and receives information with at least one of the user terminal 22 and the management server 230 via the communication network 20. If the charging station 222 is connected to the communication network 20, the lawn mower 210 may transmit and receive the information with at least one of the user terminal 22 and the management server 230 via the charging station 222.

In the present embodiment, the communication network 20 may be a wired communication transmission path, a wireless communication transmission path, or a combination of a wireless communication transmission path and a wired communication transmission path. The communication network 20 may include a wireless packet communication network, the Internet, a P2P network, a private line, a VPN, an electrical power line communication line and the like. The communication network 20: (i) may include a mobile communication network such as a mobile phone line network; and (ii) may include a wireless communication network such as a wireless MAN (for example, WiMAX (registered trademark)), a wireless LAN (for example, WiFi (registered trademark)), Bluetooth (registered trademark), Zigbee (registered trademark) or NFC (Near Field Communication).

In the present embodiment, the user terminal 22 is a communication terminal utilized by a user of the management system 200 or the lawn mower 210, but the detail thereof is not specifically limited. Examples of the user terminal 22 include a personal computer, a mobile terminal, and the like. Examples of the mobile terminal include a mobile phone, a smartphone, a PDA, a tablet, a notebook computer, a laptop computer, a wearable computer, or the like.

In the present embodiment, the management system 200 manages the work region 202. The work region 202 may be a region where the lawn mower 210 is permitted to enter. For example, the management system 200 manages the state of the work region 202. The management system 200 may manage the state of an object which is the target of the work performed in the work region 202 (also referred to as the work target in some cases). The management system 200 may manage the work to be performed in the work region 202. For example, the management system 200 manages the schedule of the work. The work schedule may be the information which defines at least one of a period when the work is performed, a place where the work is performed, an entity which performs the work, a work target, and a content of the work.

In the present embodiment, the management system 200 manages the lawn mower 210. The lawn mower 210 may be one example of an entity which performs the work. For example, the management system 200 manages a state of the lawn mower 210. For example, the management system 200 manages the location, the advancing direction, the advancing speed, the remaining energy (for example, the remaining battery level) of the lawn mower 210, the schedule of the work performed by the lawn mower 210, and the like.

In the present embodiment, the wire 206 having a conductive member is incorporated at a boundary between the work region 202 and the non-work region 204. When a voltage is applied to the both ends of the wire 206 and the current flows in the wire 206, a magnetic field is generated around the wire 206. The lawn mower 210 recognizes the magnetic field generated from the wire 206 as a boundary to distinguish the inside of the work region 202 and the outside of the work region. The wire 206 may be one example of the boundary. The magnetic field generated from the wire 206 may be one example of the boundary.

If the burying machine which buries the wire 206 underground has a self-location estimation function, the burying machine may transmit the information indicating the location where the wire 206 is placed to the management server 230 while the work to place the wire 206 is performed. Thereby, the management server 230 can manage the location of the wire 206 in the work region 202.

It is noted that, in the present embodiment, to simplify the description, the management system 200 is described in detail using, as an example, the embodiment in which the management system 200 manages the lawn mower 210. However, the management system 200 is not limited to the present embodiment. In another embodiment, the management system 200 may manage the work machine other than the lawn mower 210. The work machine may perform various types of works.

Examples of the types of work include (i) a civil engineering work, (ii) a construction work, (iii) a cultivation work of plants or agricultural products, (iv) snow clearing work, (v) cleaning work, (vi) transport work, (vii) monitoring, security, or guarding work, and the like. Examples of a cultivation work include sowing, pruning, lawn mowing, grass cutting, watering, fertilizing, soiling, weeding, and the like. The work machine may have an autonomous movement function. The work machine may be one example of the moving object.

[Outline of Each Section of the Management System 200]

In the present embodiment, the work region 202 may have a configuration similar to that of the region 100 as long as there is no technical contradiction. Likewise, the region 100 may have a configuration similar to that of the work region 202 as long as there is no technical contradiction. In the present embodiment, the wire 206 may have a configuration similar to that of the boundary 106 as long as there is no technical contradiction. Likewise, the boundary 106 may have a configuration similar to that of the wire 206 as long as there is no technical contradiction. In the present embodiment, the lawn mower 210 may have a configuration similar to that of the moving object 150 as long as there is no technical contradiction. Likewise, the moving object 150 may have a configuration similar to that of the lawn mower 210 as long as there is no technical contradiction.

In the present embodiment, the lawn mower 210 has an autonomous movement function and autonomously travels inside the work region 202. The lawn mower 210 cuts the lawn growing inside the work region 202. The lawn mower 210 may travel while cutting the lawn, or may travel without cutting the lawn. The lawn may be one example of the work target. The lawn mower 210 will be described in detail later.

In the present embodiment, the warehouse 220 stores the lawn mower 210. Upon the start time of the work, the lawn mower 210 starts from the warehouse 220 and moves toward the work region 202. The lawn mower 210 returns to the warehouse 220 after the work at the work region 202 ends. In the present embodiment, the charging station 222 charges the lawn mower 210.

In the present embodiment, the management server 230 manages various types of information related to the work region 202. For example, the management server 230 manages the mapping data indicating the geographic distribution of the attribute of various types of work region 202. The mapping data may be one example of the map information. Examples of the above-described attribute include the permission or prohibition of entrance for the lawn mower 210, the attribute of the work target, various types of parameters related to the work, the positioning precision of the lawn mower 210, and the like.

The management server 230 may manage the state of the work region 202. The management server 230 may manage the state of the work target. The management server 230 may manage the work performed in the work region 202. The management server 230 may manage the state of the lawn mower 210. For example, the management server 230 manages the location, the advancing direction, the advancing speed, and the remaining energy of the lawn mower 210, the schedule of the work performed by the lawn mower 210, and the like. The management server 230 will be described in detail later.

[Specific Configuration of Each Section in the Management System 200]

Each section of the management system 200 may be realized by the hardware, may be realized by the software, or may be realized by the hardware and software. At least a part of each section in the management system 200 may be realized by a single server, or realized by a plurality of servers. At least a part of each section in the management system 200 may be realized on a virtual server or a cloud system. At least a part of each section in the management system 200 may be realized by a personal computer or a mobile terminal. Examples of the mobile terminal include a mobile phone, a smartphone, a PDA, a tablet, a notebook computer, a laptop computer, a wearable computer, or the like. The management system 200 may store information by utilizing a distributed ledger technology or a distributed network such as a block chain.

If at least some of components constituting the management system 200 are realized by software, the components realized by the software may be realized by activating, in an information processing apparatus having a general configuration, software or a program stipulating operations about the components. The above-described information processing apparatus may include: (i) a data processing apparatus having processors such as a CPU or a GPU, a ROM, a RAM, a communication interface and the like, (ii) input apparatuses such as a keyboard, touch panel, camera, microphone, various types of sensors or GPS receiver, (iii) output apparatuses such as a display apparatus, a speaker or a vibration apparatus, and (iv) storage apparatuses (including external storage apparatuses) such as a memory or a HDD. In the above-described information processing apparatus, the above-described data processing apparatus or storage apparatus may store the above-described software or program. The above-described software or the above-described program causes, by being executed by a processor, the above-described information processing apparatus to execute operations defined by the software or the program. The above-described software or the program described above may also be stored in a non-transitory computer readable recording medium.

The above-described software or program may be a control program for controlling the lawn mower 210. The control program may be a program to enable a processor to perform a procedure to control the movement of the lawn mower 210 based on at least one of the completion level of the map information indicating the region where the lawn mower 210 is permitted to enter and the location estimation precision of the lawn mower 210. The above-described processor (i) may be the processor of the lawn mower 210 or (ii) may be the processor of the management server 230. The processor of the management server 230 may be a physical processor or may be a virtual processor. The processor may be one example of the computer.

[Outline of the Work Region 202]

Figure 3:
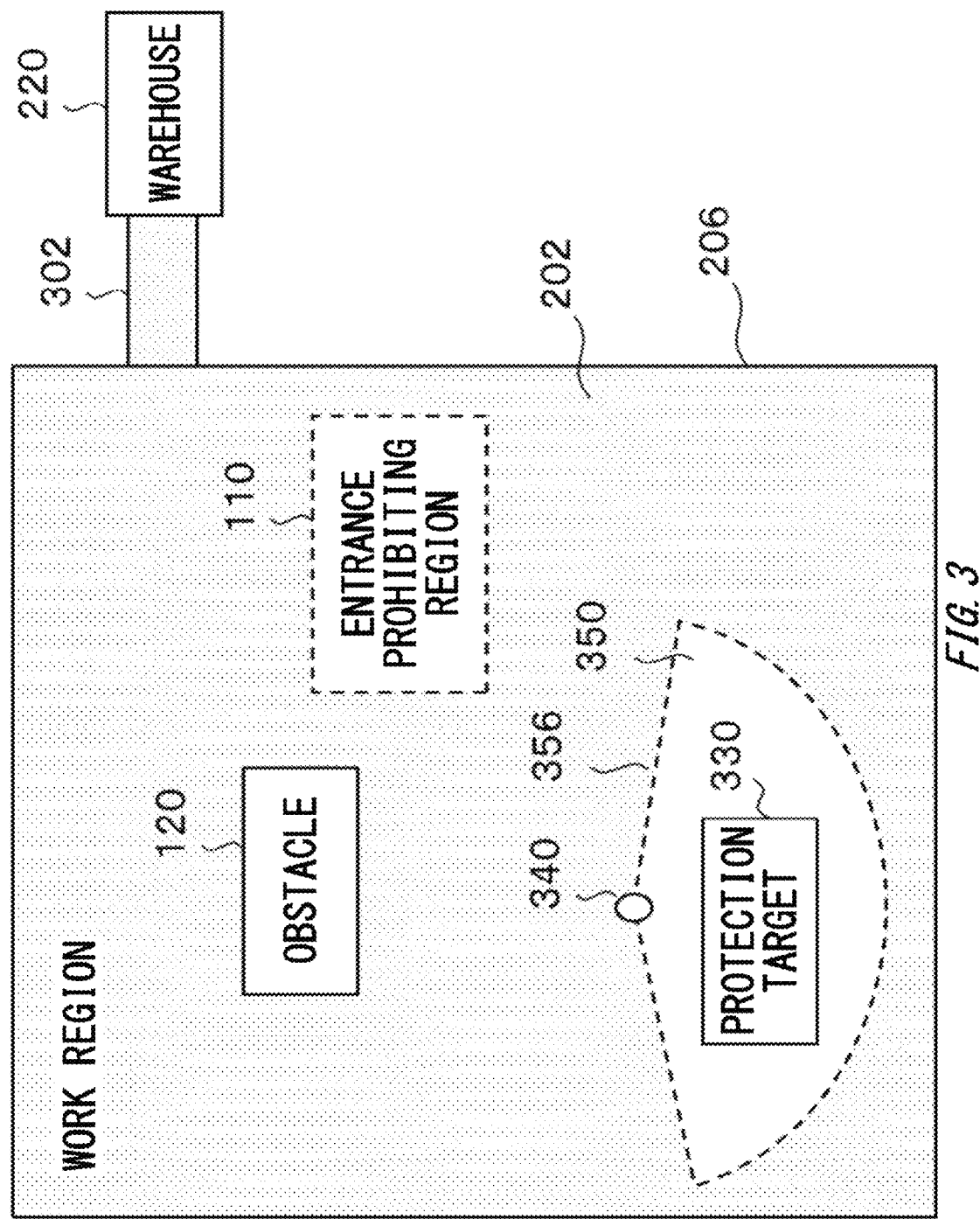
FIG. 3 schematically shows one example of the work region 202.

FIG. 3 schematically shows one example of the work region 202. In the present embodiment, the work region 202 may be a region surrounded by the wire 206. In the present embodiment, the passage 302 which connects the entrance of the warehouse 220 and a part of the work region 202 between the warehouse 220 and the work region 202. In the present embodiment, one or more entrance prohibiting regions 110, one or more obstacles 120, and one or more protection targets 330 are arranged inside the work region 202. In the present embodiment, the protected region setting apparatus 340 is arranged inside the work region 202.

In the present embodiment, the protection target 330 may be a target to be protected from the damage due to the work by the lawn mower 210 and the like. In the present embodiment, the protected region setting apparatus 340 sets the protected region 350 around the protection target 330 to prevent the lawn mower 210 from approaching the protection target 330. The protected region 350 may have a configuration similar to that of the entrance prohibiting region 110 as long as there is no technical contradiction.

For example, the protected region setting apparatus 340 sets at least a part of the boundary 356 of the protected region 350 by emitting electromagnetic wave, sound wave, ultrasonic wave, and the like. The protected region setting apparatus 340 may set at least a part of the boundary 356 of the protected region 350 by emitting electromagnetic wave, sound wave, ultrasonic, and the like with directivity. The boundary 356 of the protected region 350 may be constituted of a single continuous boundary or may be constituted of a combination of a plurality of boundaries. Thereby, the lawn mower 210 is prohibited from entering inside the protected region 350.

[Outline of the Mapping Data]

Figure 4:
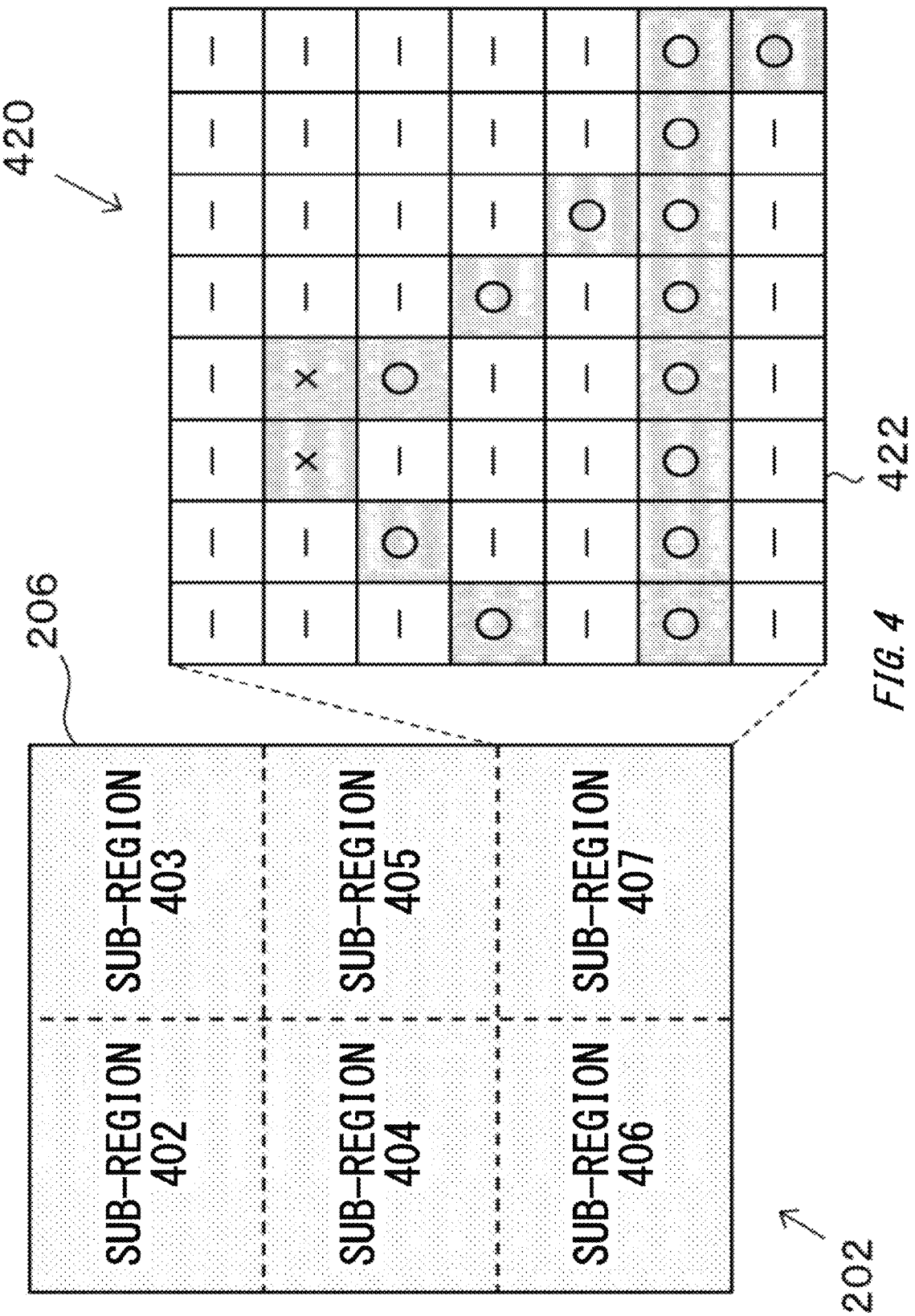
FIG. 4 schematically shows one example of the map 420 which represents a permission or prohibition of entrance as a map format.
Figure 5:
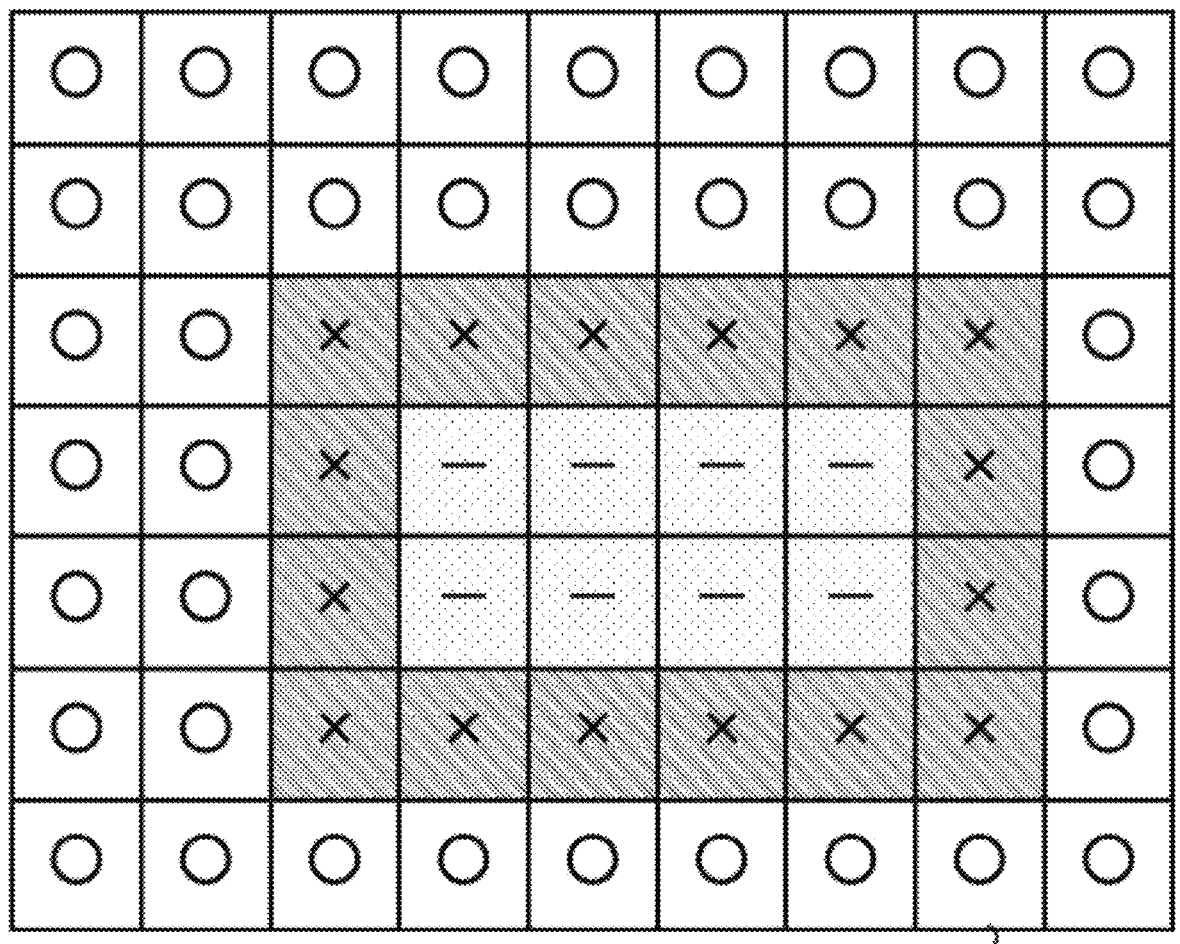
FIG. 5 schematically shows one example of the map 520 which represents a permission or prohibition of entrance as a map format.

With reference to FIG. 4 and FIG. 5, the outline of the mapping data indicating the permission or prohibition of the entrance for the lawn mower 210 in each location of the work region 202 is described. Also, with reference to FIG. 4 and FIG. 5, one example of a calculation method of the completion level of the mapping data is described.

FIG. 4 schematically shows one example of the map 420 representing the permission or prohibition of entrance with a map format. In the present embodiment, the work region 202 is divided into, for example, the sub-region 402, the sub-region 403, the sub-region 404, the sub-region 405, the sub-region 406, and the sub-region 407. According to the present embodiment, the completion level of the mapping data is calculated for each sub-region.

In the present embodiment, the map 420 indicates an evaluation related to the permission or prohibition of entrance for the lawn mower 210 in each location of the sub-region 407. In the present embodiment, the map 420 virtually divides the sub-region 407 into a plurality of unit regions having a predetermined shape and size. The above-described plurality of unit regions is continuously arranged without overlapped. The area of the unit region may be larger than a projected area of the lawn mower 210 to the ground, or may be smaller than the projected area. In the present embodiment, the map 420 indicates, for each unit region, the permission or prohibition for the lawn mower 210 to enter the unit region.

In FIG. 4, the circle marks and the cross marks indicate the unit region where the log data has been already obtained, and the dash mark indicates the unit region where the log data has not been obtained. In addition, the circle marks indicate the unit region where the lawn mower 210 is permitted to enter, and the cross marks indicates the unit region where the lawn mower 210 is prohibited from entering or the unit region where the lawn mower 210 cannot enter. It is noted that the method to represent the permission or prohibition for the lawn mower 210 to enter is not limited the present embodiment.

In a case where a plurality of log data has been obtained in a single unit region, according to one embodiment, if there is at least single log data indicating that the lawn mower 210 is prohibited from entering or the lawn mower 210 cannot enter, the unit region may be considered to be a unit region where the lawn mower 210 is prohibited from entering or the unit region where the lawn mower 210 cannot enter. In a case where a plurality of log data has been obtained in a single unit region, according to another embodiment, the evaluation indicated by many of the plurality of log data (for example, the circle marks or the cross marks) may be considered to be the evaluation related to the unit region.

According to the present embodiment, the completion level of the mapping data in the sub-region 407 is calculated, for example, as the ratio (A/B) of A to B, wherein the A and B are defined as described below. Herein, A is the number of the unit region where the log data has been already obtained. In addition, B is the number of all unit regions included in the sub-region 407. The completion level of the mapping data may be calculated by converting the above-described ratio (A/B) to the evaluation with the stepwise segmentation.

FIG. 5 schematically shows one example of the map 520 which represents the permission or prohibition to enter as a map format. In the present embodiment, the map 520 indicates the evaluation related to the permission or prohibition of the entrance of the lawn mower 210 in each location of the sub-region 407. According to FIG. 5, the unit region where the log data has not been obtained (represented with the dash marks in the figure) is surrounded by the unit region whose evaluations are indicated by the cross marks.

In this case, the completion level of the mapping data in the sub-region 407 may be calculated as the ratio (A/B) of A to B which are define as described below. Herein, A is the number of unit regions whose log data has been already obtained. In addition, B is a value obtained by subtracting "the number of unit regions which are surrounded by unit regions whose evaluations are represented with cross marks, and whose log data has not been obtained" from "the number of all the unit regions included in the sub-region 407". The completion level of the mapping data may be calculated by converting the above-described ratio (A/B) to the evaluation with the stepwise segmentation.

[Outline of the Lawn Mower 210]

Figure 6:
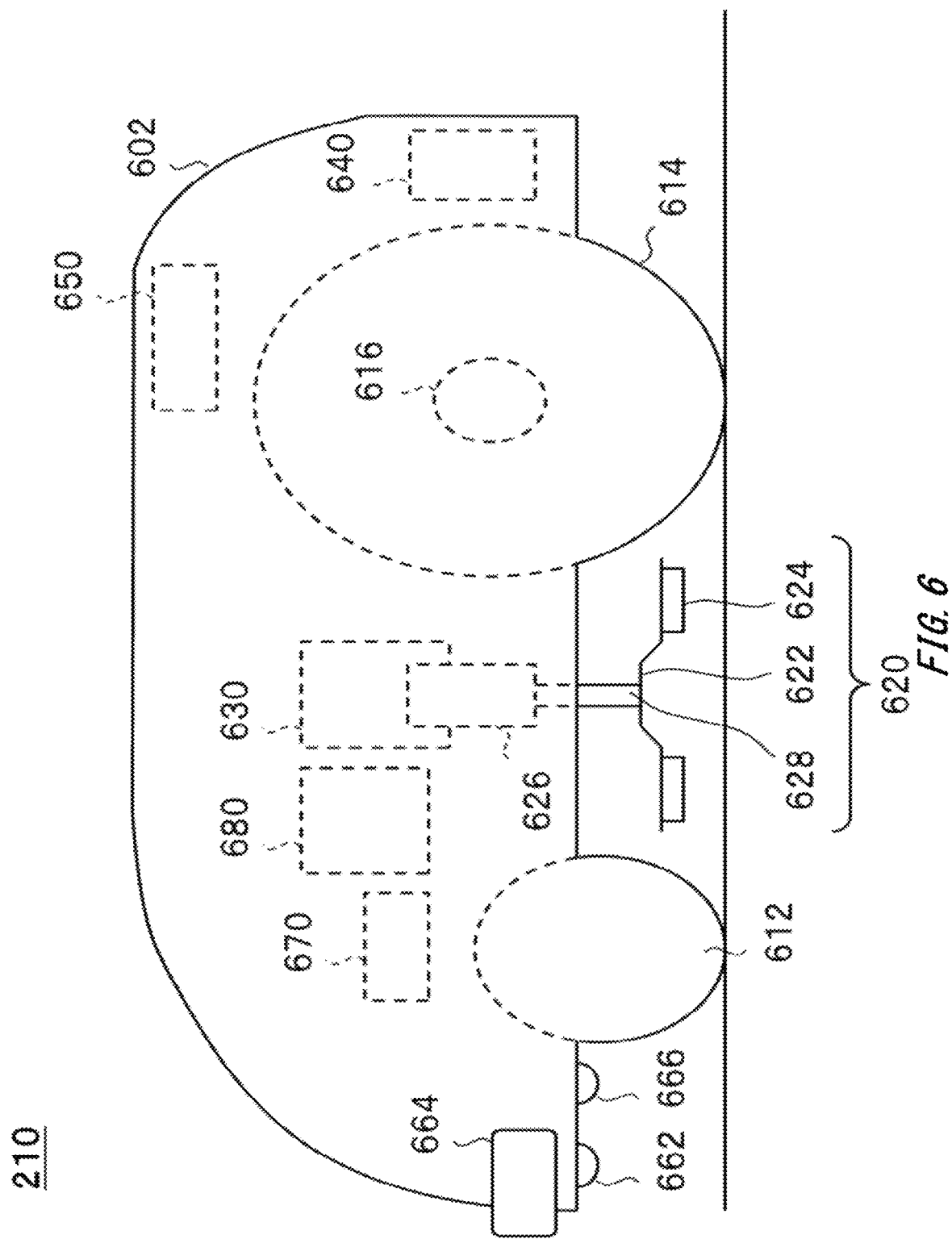
FIG. 6 schematically shows one example of the internal configuration of the lawn mower 210.

The outline of the lawn mower 210 will be described by using FIG. 6 to FIG. 16. FIG. 6 schematically shows one example of the internal configuration of the lawn mower 210. In the present embodiment, the lawn mower 210 includes the housing 602. In the present embodiment, the lawn mower 210 includes a pair of the front wheels 612 and a pair of the rear wheels 614 under the housing 602. The lawn mower 210 may include a pair of travel motors 616 which respectively drive a pair of rear wheels 614.

In the present embodiment, the lawn mower 210 includes the work unit 620. The work unit 620 includes, for example, the blade disk 622, the cutter blade 624, the work motor 626, and the shaft 628. The lawn mower 210 may include the location adjustment section 630 to adjust the location of the work unit 620.

The blade disk 622 is linked to the work motor 626 via the shaft 628. The cutter blade 624 may be a blade to cut the lawn. The cutter blade 624 is attached to the blade disk 622 and rotates with the blade disk 622. The work motor 626 rotates the blade disk 622. The blade disk 622 and the cutter blade 624 may be one example of the cutting member to cut the work target.

In the present embodiment, the lawn mower 210 includes the battery unit 640, the user interface 650, the boundary detection unit 662, the proximity detection unit 664, the distance measurement unit 666, the sensor unit 670, and the control unit 680 inside the housing 602 or on the housing 602. The control unit 680 may be one example of the control section and the control apparatus.

In the present embodiment, the battery unit 640 supplies electrical power to each section of the lawn mower 210. In the present embodiment, the user interface 650 receives a user input. The user interface 650 outputs information to a user. Examples of the user interface 650 include a keyboard, a pointing apparatus, a microphone, a touch panel, a display, a speaker, and the like.

In the present embodiment, the boundary detection unit 662 detects the wire 206 of the work region 202. The boundary detection unit 662 may detect any boundary arranged inside the work region 202. The boundary detection unit 662 may include a sensor to detect a physically set geographical boundary. The boundary detection unit 662 may detect a virtually set geographical boundary based on the location information of a virtual set geographical boundary and the location information of the lawn mower 210. If a boundary is detected, the boundary detection unit 662 may transmit the signal indicating that a boundary has been detected to the control unit 680.

In the present embodiment, the proximity detection unit 664 senses an object which is present on the advancing direction of the lawn mower 210. The proximity detection unit 664 is arranged on at least a part of the circumference of the lawn mower 210. For example, the proximity detection unit 664 is arranged in front of the lawn mower 210. The proximity detection unit 664 may be arranged in the front side or both sides of the lawn mower 210. The proximity detection unit 664 may include a touch-type proximity detection sensor. The proximity detection unit 664 may include a non-touch-type proximity detection sensor. If an object is detected on the advancing direction of the lawn mower 210, the proximity detection unit 664 may transmit a signal indicating that an object in proximity is detected to the control unit 680.

In the present embodiment the distance measurement unit 666 measures the distance between the distance measurement unit 666 and the ground. Thereby, the distance measurement unit 666 can obtain the information indicating the state of the ground on the advancing direction of the lawn mower 210. For example, the distance measurement unit 666 is arranged in front of the lawn mower 210. The distance measurement unit 666 may include a touch-type distance-measurement sensor. The distance measurement unit 666 may include a non-touch-type distance-measurement sensor. The distance measurement unit 666 may transmit the signal indicating the measurement result of the distance to the control unit 680.

The distance measurement unit 666 may detect the step or drop formed on the ground on the advancing direction of the lawn mower 210 based on the measurement result of the distance. The distance measurement unit 666 may detect the step or drop which is likely to affect a stability or safety of the travel of the lawn mower 210. If the step or drop which is likely to affect the stability or safety of the travel of the lawn mower 210 is detected, the distance measurement unit 666 may transmit the signal indicating that the step or drop has been detected to the control unit 680.

In the present embodiment, the sensor unit 670 includes various types of sensors. The sensor unit 670 may include various types of internal sensor. The sensor unit 670 may include various types of external sensor. Examples of sensor include a GPS signal receiver, a beacon receiver, a radio wave intensity measuring instrument, a millimeter wave sensor, a camera, an infrared camera a microphone, an ultrasonic sensor, an acceleration sensor, an angular velocity sensor, a wheel speed sensor, a load sensor, an idle detection sensor, a magnetic sensor, geomagnetic sensor (also referred to as orientation sensor, electronic compass, and the like in some cases), temperature sensor, humidity sensor, a soil moisture sensor, and the like. The sensor unit 670 may transmit the output from various types of sensors to the control unit 680. The wheel speed sensor may be a rotary encoder which detects the rotation angle or the number of rotations of the wheel.

In the present embodiment, the control unit 680 controls operation of the lawn mower 210. According to one embodiment, the control unit 680 controls the pair of travel motors 616 to control movement of the lawn mower 210. According to another embodiment, the control unit 680 controls the work motors 626 to control work of the lawn mower 210.

The control unit 680 may control the lawn mower 210 based on the indication from the management server 230. For example, the control unit 680 controls the lawn mower 210 according to the instruction generated by the management server 230. The control unit 680 may perform various types of judgment processes. The control unit 680 may execute at least one of judgment processes at the judgment process section 440. In one embodiment, the control unit 680 may control the lawn mower 210 based on a result the above-described judgment processes. The control unit 680 will be described in detail later.

Figure 7:
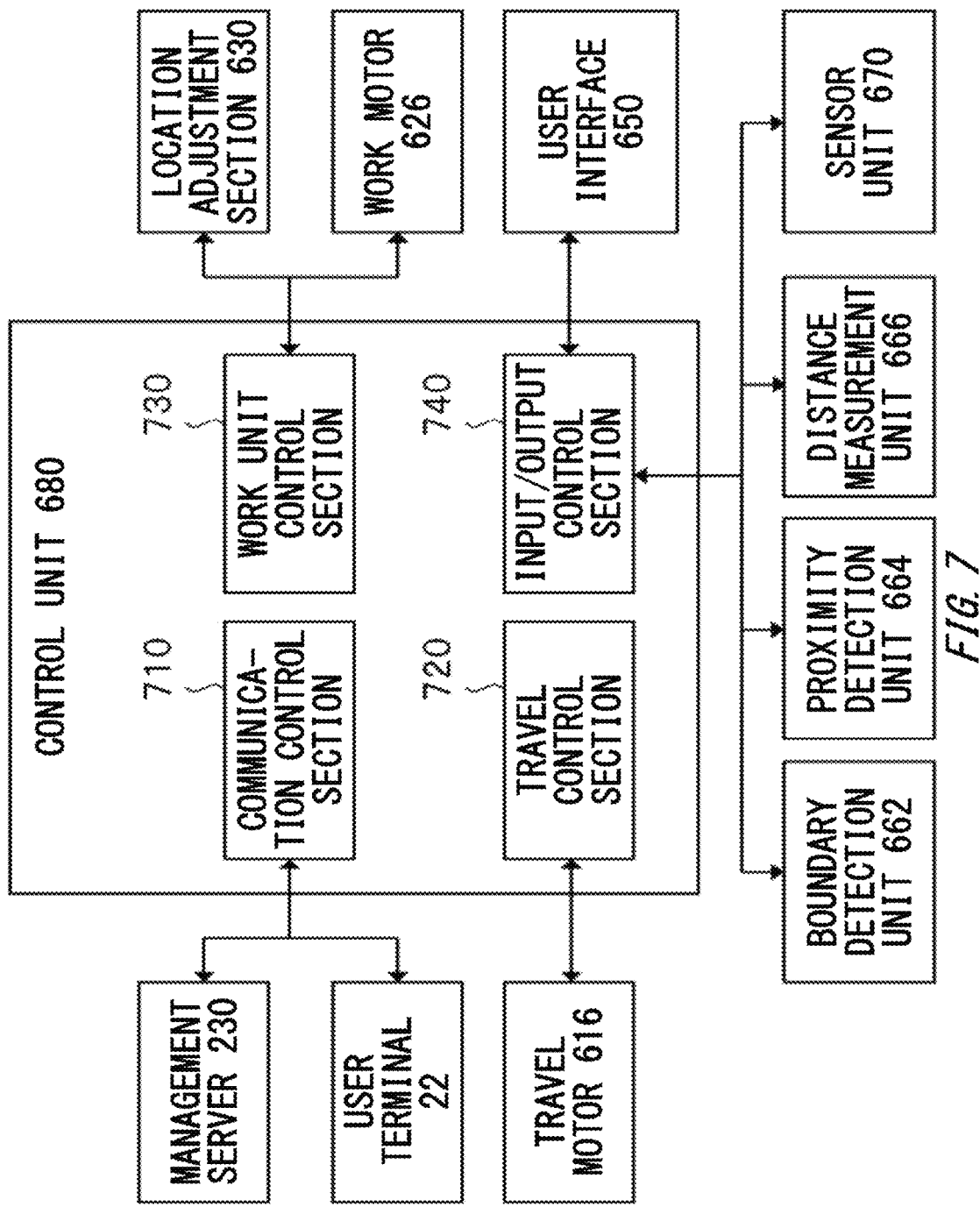
FIG. 7 schematically shows one example of the internal configuration of the control unit 680.

FIG. 7 schematically shows one example of the internal configuration of the control unit 680. In the present embodiment, the control unit 680 includes a communication control section 710, a travel control section 720, a work unit control section 730 and an input/output control section 740. The travel control section 720 may be one example the control section and the control apparatus.

In the present embodiment, the communication control section 710 controls communication with the equipment located outside the lawn mower 210. The communication control section 710 may be a communication interface compatible with one or more communication scheme.

Examples of the external equipment include the user terminal 22, the charging station 222, the management server 230, and the like.

In the present embodiment, the travel control section 720 controls the travel motor 616 to control movement of the lawn mower 210. The travel control section 720 controls the autonomous travel of the lawn mower 210. For example, the travel control section 720 controls at least one of a movement mode, an advancing speed, an advancing direction, a moving route of the lawn mower 210. The travel control section 720 may monitor the current value of the travel motor 616. The travel control section will be described in detail later.

In the present embodiment, the work unit control section 730 controls the work unit 620. The work unit control section 730 may control at least one of a work mode, a type of work, work intensity, and timing when the work is performed of the work unit 620. For example, the work unit control section 730 controls the work motor 626 to control the intensity of work of the work unit 620. The work unit control section 730 may control the location adjustment section 630 to control the intensity of work of the work unit 620. The work unit control section 730 may monitor the current value of the work motor 626. The travel control section will be described in detail later.

In the present embodiment, the input/output control section 740 accepts the input from at least one of the user interface 650, the boundary detection unit 662, the proximity detection unit 664, the distance measurement unit 666, and the sensor unit 670. The input/output control section 740 outputs the information to the user interface 650. The input/output control section 740 may control at least one of the user interface 650, the boundary detection unit 662, the proximity detection unit 664, the distance measurement unit 666, and the sensor unit 670. For example, the input/output control section 740 adjusts settings of at least one pieces of equipment among the user interface 650, the boundary detection unit 662, the proximity detection unit 664, the distance measurement unit 666, and the sensor unit 670 to control the equipment.

Figure 8:
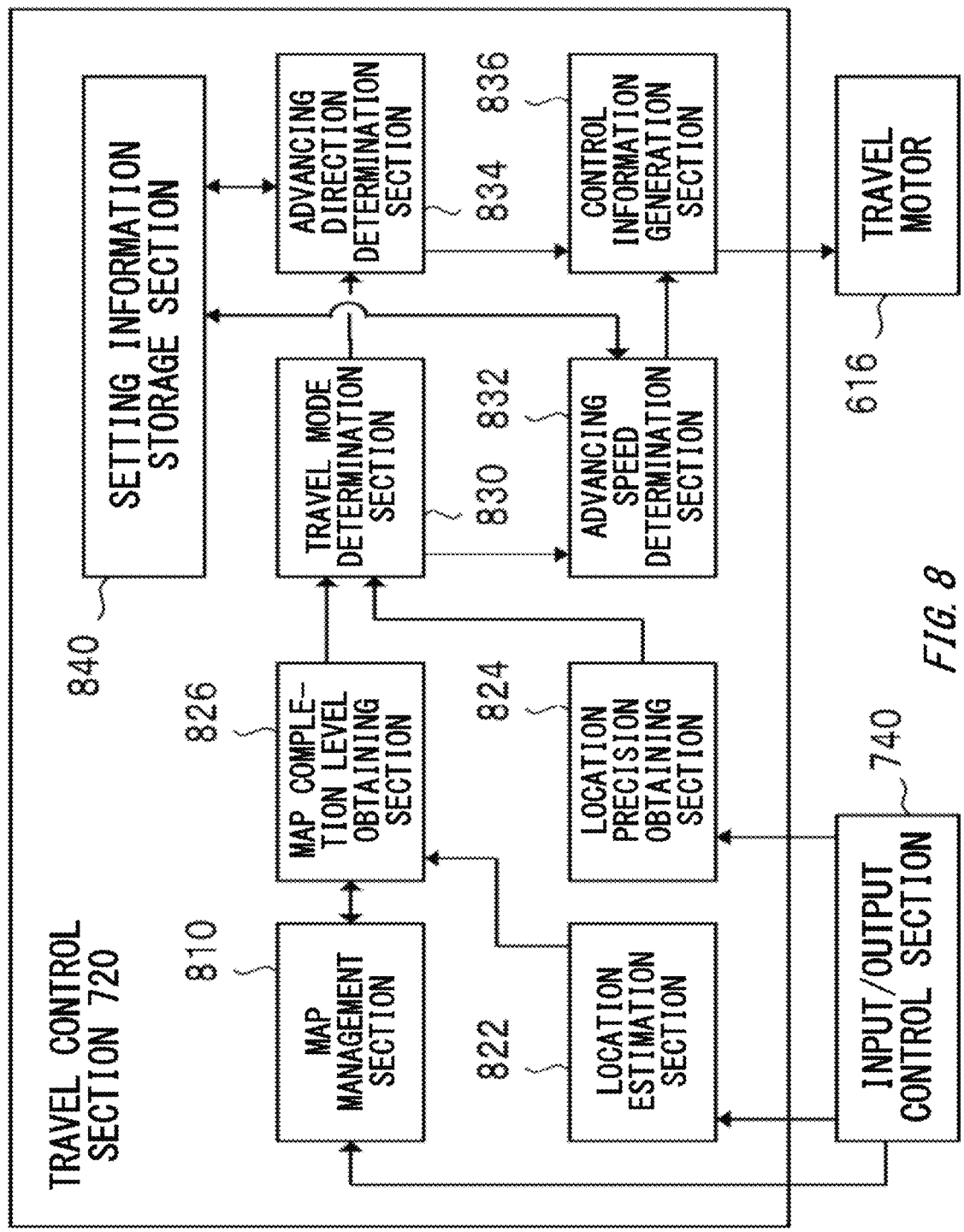
FIG. 8 schematically shows one example of the internal configuration of the travel control section 720.

FIG. 8 schematically shows one example of the internal configuration of the travel control section 720. The travel control section 720 may have a configuration similar to the control apparatus 152 or the control section 154 as long as there is no technical contradiction. Likewise, the control apparatus 152 or the control section 154 may have a configuration similar to the travel control section 720 as long as there is no technical contradiction.

In the present embodiment, the travel control section 720 includes the map management section 810. In the present embodiment, the travel control section 720 includes the location estimation section 822, the location precision obtaining section 824, and the map completion level obtaining section 826. In the present embodiment, the travel control section 720 includes the travel mode determination section 830, the advancing speed determination section 832, the advancing direction determination section 834, the control information generation section 836, and the setting information storage section 840. In the present embodiment each section of the travel control section 720 can transmit and receive information with each other without the limitation to the arrow in the figure.

In the present embodiment, the map management section 810 manages the mapping data. The map management section 810 may obtain log data. For example, the map management section 810 obtains, from the input/output control section 740, the data, as the log data, which is output from the boundary detection unit 662, the proximity detection unit 664, the distance measurement unit 666, and the sensor unit 670. The map management section 810 may obtain the information regarding the work of the lawn mower 210 from the work unit control section 730 as the log data.

The map management section 810 may generate the mapping data based on one or more pieces of log data. The map management section 810 may generate the mapping data indicating permission or prohibition for the lawn mower 210 to enter each location of the work region 202. The map management section 810 may generate the mapping data indicating (i) the attribute of the work target, (ii) various types of parameters regarding the work, or (iii) the positioning precision of the lawn mower 210 in each location of the work region 202. The map management section 810 may calculate the completion level of the mapping data. The map management section 810 will be described in detail later.

In the present embodiment, the location estimation section 822 estimates the location of the lawn mower 210. The location estimation section 822 may estimate the location of the lawn mower 210 by any location estimation method. For example, the location estimation section 822 obtains, from the input/output control section 740, the data output by the sensor unit 670. The location estimation section 822 may estimate the current location of the lawn mower 210 based on the above-described data. The location estimation section 822 may calculate the estimation precision of the location of the lawn mower 210. The location estimation section 822 may transmit the information indicating the estimation precision of the location of the lawn mower 210 to the location precision obtaining section 824.

In the present embodiment, the location precision obtaining section 824 obtains the information indicating the estimation precision of the location of the lawn mower 210 estimated by the location estimation section 822. In one embodiment, the location precision obtaining section 824 may obtain, from the sensor unit 670, via the input/output control section 740, the information indicating the estimation precision of the location of the lawn mower 210. For example, the location precision obtaining section 824 obtains the information indicating the positioning precision included in the GPS signal received by the sensor unit 670. In another embodiment, the location precision obtaining section 824 may obtain, from the location estimation section 822, the information indicating the estimation precision of the location of the lawn mower 210.

In the present embodiment, the map completion level obtaining section 826 obtains the information indicating the completion level of the mapping data at the location of the lawn mower 210 estimated by the location estimation section 822. For example, the map completion level obtaining section 826 obtains, from the location estimation section 822, the information indicating the current location of the lawn mower 210. The map completion level obtaining section 826 transmits, to map management section 810, the information indicating the current location of the lawn mower 210 to request the information indicating the completion level of the mapping data in the current location of the lawn mower 210. Thereby, the map completion level obtaining section 826 can obtain the information indicating the completion level of the mapping data in the current location of the lawn mower 210.

In the present embodiment, the travel mode determination section 830 determines the travel mode of the lawn mower 210. The travel mode determination section 830 determines the travel mode of the lawn mower 210 based on, for example, at least one of (i) the location estimation precision in the current location of the lawn mower 210, (ii) the completion level of the mapping data in the current location of the lawn mower 210, (iii) the indication from the user, and (iv) the time.

[The Embodiment in which the Location Estimation Precision is Considered]

In one embodiment, the information indicating the location estimation precision in the current location of the lawn mower 210 is input from the location precision obtaining section 824 to the travel mode determination section 830. The travel mode determination section 830 determines the travel mode of the lawn mower 210 based on the location estimation precision in the current location of the lawn mower 210.

For example, if the location estimation precision is lower than a predetermined threshold, the travel mode determination section 830 determines the travel mode of the lawn mower 210 such that the advancing speed of the lawn mower 210 is lower relative to the case in which the location estimation precision is higher than the threshold. It is noted that, if the location estimation precision is lower than a predetermined threshold, the travel mode determination section 830 may determine the travel mode of the lawn mower 210 such that the advancing speed of the lawn mower 210 is higher relative to the case in which the location estimation precision is higher than the threshold.

In addition, if the location estimation precision is lower than a predetermined threshold, the travel mode determination section 830 selects the first random mode or second random mode as the travel mode of the lawn mower 210. On the other hand, if the location estimation precision is higher than a predetermined threshold, the travel mode determination section 830 may select the parallel mode or program mode as the travel mode of the lawn mower 210.

[The Embodiment in which the Completion Level of the Mapping Data is Considered]

In another embodiment, the information indicating the completion level of the mapping data at the current location of the lawn mower 210 is input from the map completion level obtaining section 826 to the travel mode determination section 830. The travel mode determination section 830 determines the travel mode of the lawn mower 210 based on the completion level of the mapping data at the current location of the lawn mower 210.

For example, if the completion level of the mapping data is lower than a predetermined threshold, the travel mode determination section 830 selects the second random mode as the travel mode of the lawn mower 210. On the other hand, if the completion level of the mapping data is higher than a predetermined threshold, the travel mode determination section 830 selects the parallel mode, the program mode, or the first random mode as the travel mode of the lawn mower 210.

If the completion level of the mapping data is lower than a predetermined threshold, the travel mode determination section 830 may select the first random mode or the second random mode as the travel mode of the lawn mower 210. On the other hand, if the completion level of the mapping data is higher than a predetermined threshold, the travel mode determination section 830 may select the parallel mode or program mode as the travel mode of the lawn mower 210.

In addition, if the completion level of the mapping data is lower than a predetermined threshold, the travel mode determination section 830 may determine the travel mode of the lawn mower 210 such that the advancing speed of the lawn mower 210 is smaller relative to the case in which the completion level of the mapping data is higher than the threshold. If the completion level of the mapping data is lower than a predetermined threshold, the travel mode determination section 830 may determine the travel mode of the lawn mower 210 such that the advancing speed of the lawn mower 210 is higher relative to the case in which the completion level of the mapping data is higher than the threshold.

Other Embodiments

In yet another embodiment, if the proximity detection unit 664 or the distance measurement unit 666 detects the unknown obstacle 120, the travel mode determination section 830 determines the travel mode of the lawn mower 210 such that the advancing speed of the lawn mower 210 is equal to or lower than a predetermined value. The travel mode determination section 830 may determine the travel mode of the lawn mower 210 such that the lawn mower 210 performs the work to detect the location, size, and range or shape of the obstacle 120. For example, the travel mode determination section 830 selects the shape detection mode as the travel mode of the lawn mower 210.

After the lawn mower 210 performs the work to detect the location, size, and range or shape for at least part of the above-described obstacle 120, the travel mode determination section 830 may determine to change the travel mode of the lawn mower 210 back to the travel mode before the obstacle 120 is detected. In a case where the boundary detection unit 662 detects a known boundary, even when the work to detect the location, size, and range or shape is not being performed for at least a part of the boundary, the travel mode determination section 830 may perform a process similar to that in a case where an unknown obstacle 120 is found.

In yet another embodiment, if the lawn mower 210 completes a planned work, or if the lawn mower 210 receives the return instruction from the user terminal 22 or the management server 230, the travel mode determination section 830 may determine the travel mode of the lawn mower 210 such that the lawn mower 210 returns to the warehouse 220. The travel mode determination section 830 may determine the travel mode of the lawn mower 210 such that the lawn mower 210 travels along the wire 206 of the work region 202 to return to the warehouse 220. In addition, the travel mode determination section 830 may determine the travel mode of the lawn mower 210 such that the lawn mower 210 moves faster relative to the case in which the lawn mower 210 moves inside the work region 202. For example, the travel mode determination section 830 selects the guide mode as the travel mode of the lawn mower 210.

In the present embodiment, the advancing speed determination section 832 determines the advancing speed of the lawn mower 210. For example, the advancing speed determination section 832 receives, as the input, the information indicating the movement mode of the lawn mower 210 from the travel mode determination section 830. The advancing speed determination section 832 obtains the information indicating at least one of (i) the settings regarding the advancing speed and (ii) the algorithm to determine the advancing speed which corresponds to the input movement mode with reference to the setting information storage section 840. The advancing speed determination section 832 determines the advancing speed of the lawn mower 210 based on the information obtained with reference to the setting information storage section 840.

In the present embodiment, the advancing direction determination section 834 determines the advancing direction of the lawn mower 210. The advancing direction determination section 834 may determine the advancing direction of the lawn mower 210 based on the travel mode selected by the travel mode determination section 830. As described above, the advancing direction of the lawn mower 210 is determined according to, for example, the operation of the lawn mower 210 in a case when the lawn mower 210 reaches any boundary. If the lawn mower 210 reaches a boundary which distinguishes two adjacent sub-regions, the advancing direction determination section 834 may determine not to turn at the boundary.

For example, the advancing direction determination section 834 receives, as the input, the information indicating the movement mode of the lawn mower 210 from the travel mode determination section 830. The advancing direction determination section 834 obtains the information indicating at least one of (i) the settings regarding the advancing direction and (ii) the algorithm to determine the advancing direction which corresponds to the input movement mode with reference to the setting information storage section 840. The advancing direction determination section 834 determines the advancing direction of the lawn mower 210 based on the information obtained with reference to the setting information storage section 840.

As described above, examples of the travel mode include the program mode, the guide mode, the shape detection mode, the first random mode, the second random mode, the parallel mode, and the like. If each travel mode is selected, the advancing direction determination section 834 determines the advancing direction of the lawn mower 210 according to, for example, the procedure described below.

[Program Mode]

If the program mode is selected, the advancing direction determination section 834 determines the advancing direction of the lawn mower 210 after turning such that the lawn mower 210 moves on a predetermined path. For example, the advancing direction determination section 834 determines the advancing direction of the lawn mower 210 after turning such that the lawn mower 210 turns toward a predetermined direction at a predetermined location.

[Guide Mode]

If the guide mode is selected, the advancing direction determination section 834 determines the advancing direction of the lawn mower 210 after turning such that the lawn mower 210 moves along the boundary. For example, the advancing direction determination section 834 determines the advancing direction of the lawn mower 210 during a turning operation such that the lawn mower 210 repeats the turning operation until the extending direction of the boundary is approximately parallel to the advancing direction after turning. In addition, if the distance between the location of the lawn mower 210 and a representative point of the boundary exceeds a predetermined threshold after the lawn mower 210 starts moving along the boundary, the advancing direction determination section 834 determines to change the advancing direction of the lawn mower 210. Then, the advancing direction determination section 834 determines the advancing direction of the lawn mower 210 after changing the course such that the distance between the location of the lawn mower 210 and the representative point of the boundary is small. In this case, for example, the lawn mower 210 moves along the boundary line in zigzag.

[Shape Detection Mode]

If the shape detection mode is selected, the advancing direction determination section 834 determines the advancing direction of the lawn mower 210 after turning such that the lawn mower 210 detects a location, a size, and a range or shape of at least a part of the boundary. For example, the advancing direction determination section 834 determines the advancing direction of the lawn mower 210 after turning such that the lawn mower 210 repeats advancing, boundary sensing, receding, and turning around the boundary.

The advancing direction determination section 834 may determine the advancing direction of the after turning based on any probability model. For example, the advancing direction determination section 834 randomly determines the advancing direction after turning. The advancing direction determination section 834 may determine the advancing direction of the lawn mower 210 after turning such that the advancing direction after turning satisfies a predetermined constraint condition. The advancing direction determination section 834 may determine the advancing direction of the lawn mower 210 after turning based on any probability model such that the advancing direction after turning satisfies a predetermined constraint condition.

The constraint condition may be the condition that the angle formed by the advancing direction before turning and the advancing direction after turning is within a predetermined numerical range. The predetermined numerical range may be equal to or lower than 90 degrees, preferably less than 90 degrees, more preferably equal to or lower than 60 degrees, more preferably equal to or lower than 30 degrees, more preferably equal to or lower than 15 degrees, or more preferably less than 15 degrees. Herein, the angle formed by the advancing direction before turning and the advancing direction after turning means, in a case when a starting point of a plane vector indicating an advancing direction after turning and a starting point of a plane vector indicating an advancing direction before turning are overlapped, the angle equal to or lower than 180 degrees among two angles which are formed by the above-described two vectors.

[First Random Mode]

If the first random mode is selected, the advancing direction determination section 834 determines the advancing direction after turning based on any probability model. For example, the advancing direction determination section 834 randomly determines the advancing direction after turning.

[Second Random Mode]

If the second random mode is selected, the advancing direction determination section 834 determines the advancing direction of the lawn mower 210 after turning such that the advancing direction after turning satisfies a predetermined constraint condition. The advancing direction determination section 834 may determine the advancing direction of the lawn mower 210 after turning based on any probability model such that the advancing direction after turning satisfies a predetermined constraint condition.

In one embodiment, the constraint condition may be the condition that the angle formed by the extending direction of the boundary and the advancing direction after turning is within a predetermined numerical range. The predetermined numerical range may be equal to or higher than 15 degrees and equal to or lower than 90 degrees, preferably higher than 15 degrees and equal to or lower than 90 degrees, more preferably equal to or higher than 30 degrees and equal to or lower than 90 degrees, yet more preferably equal to or higher than 45 degrees and equal to or lower than 90 degrees, and further more preferably equal to or higher than 60 degrees and equal to or lower than 90 degrees. Herein, the advancing direction after turning is limited to the direction from the boundary of region toward the inner side of the region. Thus, the angle formed by the extending direction of the boundary and the advancing direction after turning may mean, in a case when the start point of the plane vector indicating the advancing direction after turning is overlapped on the straight line indicating the extending direction of the boundary, the angle equal to or less than 90 degrees among the two angles formed by the above-described plane vector and the straight line.

According to the above-described embodiment, for one angle, two candidates exist as the advancing direction after turning. In this case, the advancing direction determination section 834 may determine the advancing direction of the lawn mower 210 after turning such that the probability that, among two candidates related to the advancing direction after turning, the candidate which forms a smaller angle with the advancing direction before turning is selected is higher than the probability that the other is selected. For example, the advancing direction determination section 834 selects, among two candidates related to the advancing direction after turning, the candidate which forms a smaller angle with the advancing direction before turning as the advancing direction of the lawn mower 210 after turning. It is noted that the advancing direction determination section 834 may determine the advancing direction of the lawn mower 210 after turning such that the probability that, among two candidates related to the advancing direction after turning, the candidate which forms a smaller angle with the advancing direction before turning is selected is lower than the probability that the other is selected.

In another embodiment, if at least one of the wire 206 of the work region 202 and any boundary arranged inside the work region 202 have a region whose log data has not been obtained, the constraint condition may be the condition that the probability that the direction which leads the lawn mower 210 to the region is selected is higher than the probability that the other direction is selected. Likewise, inside the work region 202, if there is a region in which the completion level of the mapping data is lower than a predetermined threshold, the constraint condition is the condition that the probability that the direction which leads the lawn mower 210 to the region is selected is higher than the probability that the other direction is selected.

[Parallel Mode]

If the parallel mode is selected, the advancing direction determination section 834 determines the advancing direction of the lawn mower 210 after turning such that the angle formed by the advancing direction before turning and the advancing direction after turning is approximately 180 degrees. In addition, the advancing direction determination section 834 determines the advancing direction of the lawn mower 210 during a turning operation such that the value of the gap between the path before turning and the path after turning is appropriate.

In the present embodiment, the advancing direction determination section 834 may determine the return route to the warehouse 220. For example, if the lawn mower 210 completes a planned work or if the lawn mower 210 receives a return instruction from the user terminal 22 or the management server 230, the travel mode determination section 830 determines the travel mode of the lawn mower 210 such that the lawn mower 210 returns along the wire 206 of the work region 202. When the lawn mower 210 reaches the wire 206, the advancing direction determination section 834 determines, among two extending directions of the wire 206, the direction toward which the lawn mower 210 advances. Based on the shape of the boundary of the work region 202 formed by the location of the lawn mower 210 and the wire 206, the advancing direction determination section 834 may determine, among two extending direction of the wire 206, the direction toward which the lawn mower 210 advances.

In the present embodiment, the control information generation section 836 generates the control information to control the travel motor 616. The control information generation section 836 may generate the control signal based on the travel mode determined by the travel mode determination section 830. The control information generation section 836 may generate the control signal based on the advancing speed determined by the advancing speed determination section 832. The control information generation section 836 may generate the control signal based on the advancing direction determined by the advancing direction determination section 834. The control information generation section 836 may transmit the generated control information to the travel motor 616.

According to one embodiment, the control information generation section 836 generates the control information such that at least one of (i) the advancing speed of the lawn mower 210 and the (ii) operation performed when the lawn mower 210 reaches any boundary are different between (a) in the case where the completion level of the mapping data at the location of the lawn mower 210 satisfies a predetermined first condition and (b) in the case where the completion level of the mapping data at the location of the lawn mower 210 satisfies a predetermined second condition. The second condition may be a condition different from the first condition.

Examples of the first condition includes the condition that the completion level of the mapping data is lower than a predetermined threshold, the condition that the completion level of the mapping data is equal to or lower than a threshold a predetermined, the condition that the completion level of the mapping data is higher than a predetermined threshold, the condition that the completion level of the mapping data is equal to or higher than a predetermined threshold, and the combination thereof. The second condition may be the condition that the completion level of the mapping data does not satisfy the first condition.

For example, if the completion level of the mapping data at the location of the lawn mower 210 satisfies the first condition, the control information generation section 836 generates one or more pieces of control information such that (i) the set value of the advancing speed of the lawn mower 210 is set to a smaller value with respect to the case in which the completion level of the mapping data satisfies the second condition and (ii) when the lawn mower 210 reaches any boundary, the advancing direction of the lawn mower 210 is determined based on a probability model. More specifically, the first condition is the condition that the completion level of the mapping data is equal to or lower than a predetermined threshold or smaller than the threshold, and the second condition may be the condition that the completion level of the mapping data is higher than the above-described threshold or equal to or higher than the threshold.

If the completion level of the mapping data at the location of the lawn mower 210 satisfies the first condition, the control information generation section 836 may generate the control information such that the advancing direction of the lawn mower 210 is restricted. For example, the advancing direction determination section 834 determines, based on any probability model, the advancing direction of the lawn mower 210 after turning such that the advancing direction of the lawn mower 210 after turning satisfies a predetermined constraint condition. The control information generation section 836 generates one or more pieces of control information based on the determination result of the advancing direction determination section 834.

The constraint condition may be the condition that the angle formed by the extending direction of the boundary and the advancing direction after turning is within a predetermined numerical range. The predetermined numerical range may be equal to or higher than 15 degrees and equal to or lower than 90 degrees, preferably higher than 15 degrees and equal to or lower than 90 degrees, more preferably equal to or higher than 30 degrees and equal to or lower than 90 degrees, yet more preferably equal to or higher than 45 degrees and equal to or lower than 90 degrees, and furthermore preferably equal to or higher than 60 degrees and equal to or lower than 90 degrees.

The constraint condition may be the condition that the allowable range of the angle formed by the advancing direction of the lawn mower 210 and the extending direction of the boundary which the lawn mower 210 reaches is smaller relative to the case in which the completion level of the mapping data does not satisfy the first condition. For example, the allowable range of the angle formed by the advancing direction of the lawn mower 210 and the extending direction of the boundary which the lawn mower 210 reaches in the case in which the second random mode is selected is smaller relative to the case in which the first random mode or program mode is selected. Therefore, for example, the above-described constraint condition is satisfied if the travel mode determination section 830 selects the second random mode as the travel mode of the lawn mower 210 in the case in which the completion level of the mapping data is lower than a predetermined threshold, or if the travel mode determination section 830 selects the program mode or the first random mode as the travel mode of the lawn mower 210 in the case in which the completion level of the mapping data is higher than a predetermined threshold.

In the present embodiment, in the case in which the lawn mower 210 is to be returned to the warehouse 220, when the completion level of the map information at the location of the lawn mower 210 satisfies the first condition, the control information generation section 836 generates one or more pieces of control information such that the lawn mower 210 returns to the warehouse 220 along the wire 206. For example, the control information generation section 836 generates the control information used to enable the lawn mower 210 to move straight until the wire 206 is detected. In addition, the control information generation section 836 generates the control signal indicating, among the extending direction of the wire 206, toward which direction the lawn mower 210 should advance. Then, the control information generation section 836 generates a control signal so that the lawn mower 210 advances along the wire 206. The control information generation section 836 may generate the control signal to indicate a set value of the advancing speed of the lawn mower 210.

In another embodiment, the control information generation section 836 generates the control signal such that at least one of (i) the advancing speed of the lawn mower 210 and (ii) the operation performed when the lawn mower 210 reaches the boundary of the region are different between (a) in the case in which the location estimation precision of the lawn mower 210 satisfies the predetermined third condition and (b) in the case in which the location estimation precision of the lawn mower 210 satisfies the predetermined fourth condition. Each of the third condition and the fourth condition may be a condition different from the first condition and the second condition. The fourth condition may be the condition different from the third condition.

Examples of the third condition include the condition that the location estimation precision is lower than a predetermined threshold, the condition that the location estimation precision is equal to or lower than a predetermined threshold, the condition that the location estimation precision is higher than a predetermined threshold, the condition that the location estimation precision is equal to or higher than the predetermined threshold, and the combination thereof. The fourth condition may be the condition that the location estimation precision of the lawn mower 210 does not satisfy the third condition.

For example, if the location estimation precision of the lawn mower 210 satisfies the third condition, the control information generation section 836 generates one or more control information such that (i) the set value of the advancing speed of the lawn mower 210 is set to a value smaller with respect to the case in which the location estimation precision of the lawn mower 210 satisfies the fourth condition and (ii) when the lawn mower 210 reaches any boundary, the advancing direction of the lawn mower 210 is determined based on a probability model. More specifically, the third condition is the condition that the location estimation precision is equal to or lower than a predetermined threshold or lower than the threshold, and the fourth condition is the condition that the location estimation precision is higher than the above-described threshold or equal to or higher than the threshold.

In the present embodiment, in the case in which the lawn mower 210 is to be returned to the warehouse 220, when the location estimation precision of the lawn mower 210 satisfies the third condition, the control information generation section 836 generates one or more pieces of control information such that the lawn mower 210 returns to the warehouse 220 along the wire 206. For example, the control information generation section 836 generates the control information used to enable the lawn mower 210 to move straight until the wire 206 is detected. In addition, the control information generation section 836 generates the control signal indicating, among the extending direction of the wire 206, toward which direction the lawn mower 210 should advance. Then, the control information generation section 836 generates a control signal so that the lawn mower 210 advances along the wire 206. The control information generation section 836 may generate the control signal to indicate a set value of the advancing speed of the lawn mower 210.

In the present embodiment, the case in which the travel control section 720 is arranged on the lawn mower 210 is described. However, the travel control section 720 is not limited to the present embodiment. In another embodiment, the travel control section 720 may be arranged on the management server 230. A part of the travel control section 720 may be arranged on the management server 230.

Figure 9:
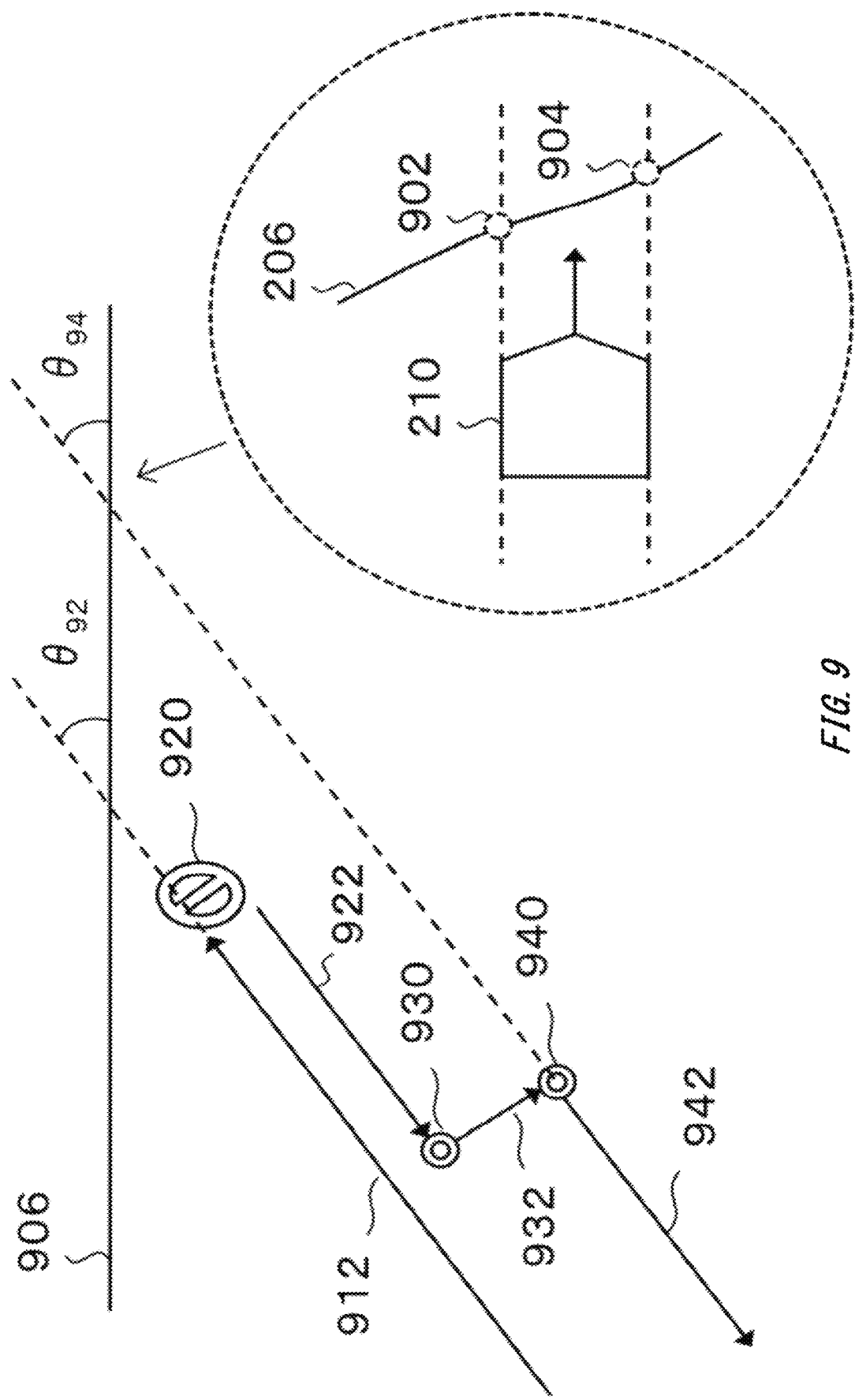
FIG. 9 schematically shows one example of a determination method of a turning angle.

The outline of the determination method of the turning angle is described with reference to FIG. 9, FIG. 10, and FIG. 11. FIG. 9 schematically shows one example of the procedure for the advancing direction determination section 834 to determine the turning angle in a case in which the parallel mode is selected as the movement mode of the lawn mower 210.

In FIG. 9, the straight line 906 indicates the extending direction of the wire 206 at the location 920 where the lawn mower 210 reaches the wire 206. It is noted that $\theta_{92}$ indicates the angle formed by the advancing direction 912 of the before turning and the straight line 906. $\theta_{94}$ indicates the angle formed by the advancing direction 942 after turning and the straight line 906.

As shown in the region surrounded by a dashed circle in FIG. 9, the straight line 906 may be a straight line connecting the point 902 and the point 904 on the wire 206. The point 902 and the point 904 are the ends of the region in which the wire 206 intersects with the shadow of the lawn mower 210 in a case in which the lawn mower 210 is projected onto the wire 206 in the direction parallel to the advancing direction before turning. The point 902 and the point 904 may be the ends at the side of the work region 202 of the wire 206.

In the present embodiment, the lawn mower 210 first moves forward facing the advancing direction 912 before turning to approach the wire 206. The lawn mower 210 detects the wire 206 of the location 920. Thus, the lawn mower 210 recedes, to the turning location 930, toward the advancing direction 922 during a turning operation. The angle formed by the advancing direction 922 and the advancing direction 912 is, for example, approximately 180 degrees, but is not specifically limited.

Then, after turning at the turning location 930, the lawn mower 210 moves forward to the turning location 940 facing the advancing direction 932 of the during a turning operation. The angle formed by the advancing direction 932 and the advancing direction 912 is, for example, approximately 90 degrees, but is not specifically limited. In addition, the turning location 940 is set such that the offset amount between the path before turning and the path after turning is an appropriate value in which the location of the cutter blade 624 is considered.

Then, after turning at the turning location 940, the lawn mower 210 moves forward facing the advancing direction 942 after turning. The advancing direction determination section 834 determines the advancing direction 942 of the lawn mower 210 after turning such that the angle formed by the advancing direction 942 and the advancing direction 912 is approximately 180 degrees.

Figure 10:
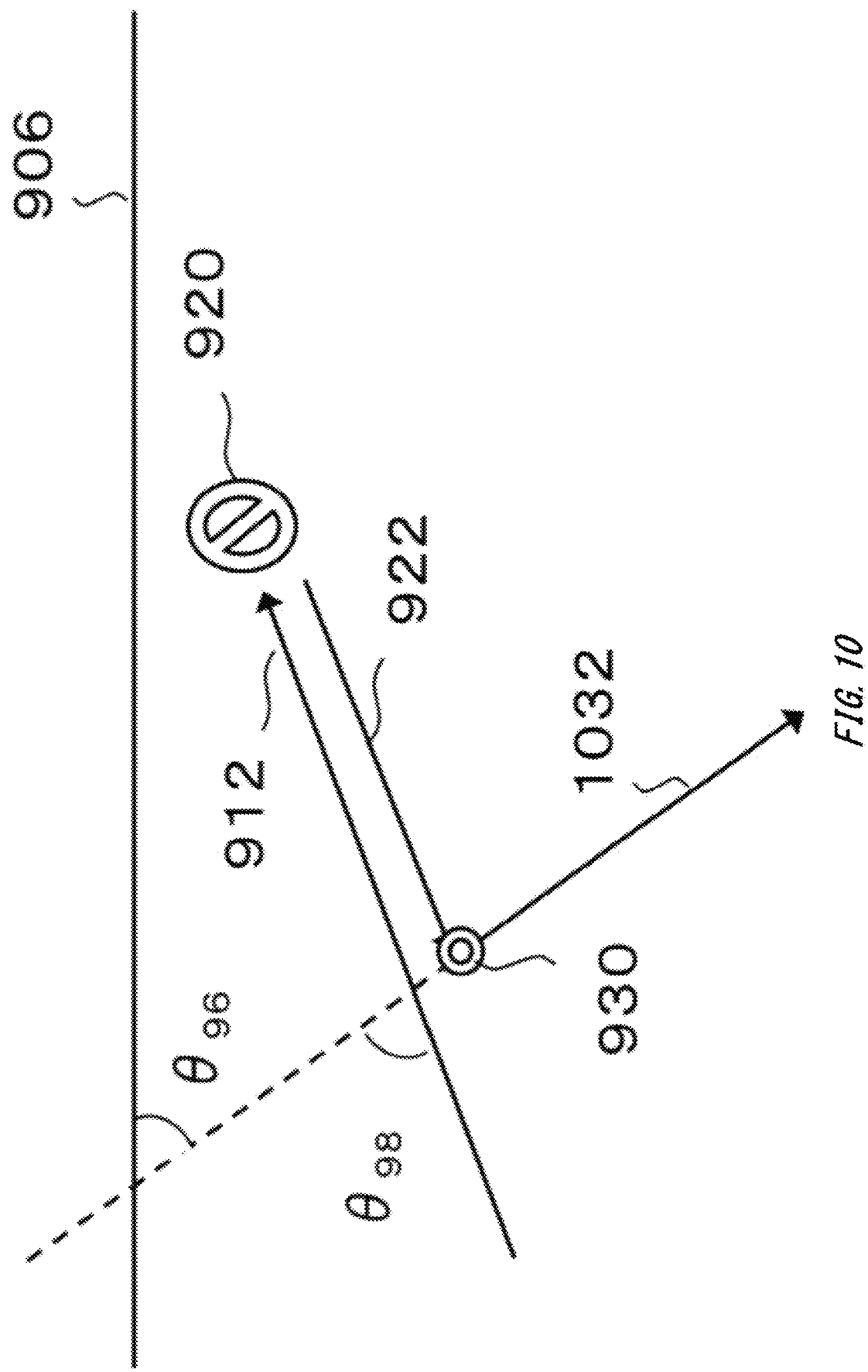
FIG. 10 schematically shows one example of a determination method of a turning angle.

FIG. 10 schematically shows one example of a procedure for the advancing direction determination section 834 to determine the turning angle in a case in which the first random mode or the second random mode is selected as the movement mode of the lawn mower 210. In the present embodiment, the lawn mower 210 first moves forward facing the advancing direction 912 before turning to approach the wire 206. The lawn mower 210 detects the wire 206 at the location 920. Thus, the lawn mower 210 recedes, to the turning location 930, toward the advancing direction 922 during a turning operation. The angle formed by the advancing direction 922 and the advancing direction 912 is, for example, approximately 180 degrees, but is not specifically limited.

Then, after turning at the turning location 930, the lawn mower 210 moves forward facing the advancing direction 1032 after turning. The advancing direction determination section 834 determines the angle $\theta_{96}$ formed by the advancing direction 1032 and the straight line 906 based on any probability model. It is noted that, depending on the definition of the angle $\theta_{96}$, the angle $\theta_{96}$ may be a value equal to or higher than 0 degree and equal to or lower than 90 degrees.

If the travel mode of the lawn mower 210 is set to the first random mode, the advancing direction determination section 834 determines the angle $\theta_{96}$, such that, for example, values from 0 to 90 are selected with the same probability. The advancing direction determination section 834 may determine the angle $\theta_{96}$ such that the integers from 0 or 1 to 90 are selected with the same probability. The advancing direction determination section 834 may determine the angle $\theta_{96}$ such that a plurality of candidates is selected with the same probability.

Even if a single value is determined as the angle $\theta_{96}$ in the definition of the angle $\theta_{96}$, there may be two candidates of the advancing direction 1032 after turning. Thus, the advancing direction determination section 834 selects one among two candidates as the advancing direction 1032 after turning. The advancing direction determination section 834 may select one of two candidates based on any probability model. The advancing direction determination section 834 may randomly select one of two candidates.

The advancing direction determination section 834 may determine the advancing direction 1032 after turning such that the probability that, among two candidates, one which forms the smaller angle $\theta_{98}$ with the advancing direction 912 before turning is selected is higher than the probability that the other is selected. The advancing direction determination section 834 may determine the advancing direction 1032 after turning such that the probability that, among two candidates, one which forms the smaller angle $\theta_{98}$ with the advancing direction 912 before turning is selected is lower than the probability that the other is selected.

If the travel mode of the lawn mower 210 is set to the first random mode, the advancing direction determination section 834 determines the angle $\theta_{96}$ such that the advancing direction 1032 after turning satisfies a predetermined constraint condition. The advancing direction determination section 834 may determine, based on any probability model, the angle $\theta_{96}$ such that the advancing direction 1032 after turning satisfies a predetermined constraint condition.

For example, the advancing direction determination section 834 determines the angle $\theta_{96}$ such that the values, among values from 0 to 90, included in one or more predetermined numerical ranges are selected with the same probability. The above-described numerical range may be the range more than 0 and less than 90. The above-described numerical range may be the range equal to or more than 1 and equal to or less than 89. Thereby, for example, values from 30 degrees to 45 degrees and from 60 degrees to 80 degrees are selected with the same probability.

The advancing direction determination section 834 may determine the angle $\theta_{96}$ such that values, among integers from 0 or 1 to 90, included in one or more predetermined numerical range are selected with the same probability. The advancing direction determination section 834 may determine the angle $\theta_{96}$ such that a plurality of candidates included in one or more predetermined numerical range is selected with the same probability.

The advancing direction determination section 834 may determine the angle $\theta_{96}$ such that the probability that, among values from 0 to 90, values included in one or more predetermined numerical range are selected is higher than the probability that the other values are selected. Thereby, for example, the probability that the lawn mower 210 goes to a region where the log data has not been obtained can be increased. In addition, the probability that the lawn mower 210 goes to a region where the completion level of the mapping data is low can be increased.

Figure 11:
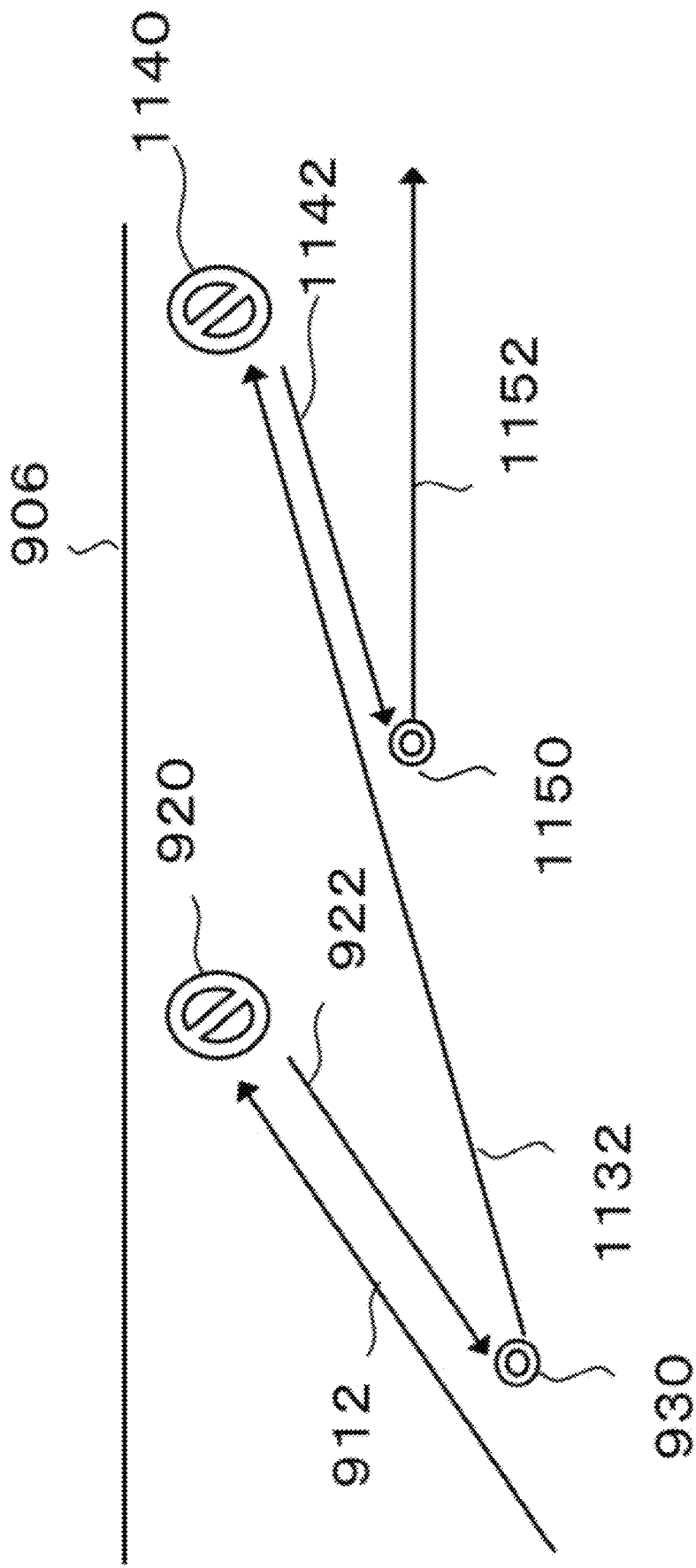
FIG. 11 schematically shows one example of a determination method of a turning angle.

FIG. 11 schematically shows one example of the procedure for the advancing direction determination section 834 to determine the turning angle in a case in which the mode to move along the boundary is selected as the movement mode of the lawn mower 210. In the present embodiment, the lawn mower 210 first moves forward facing the advancing direction 912 before turning to approach the wire 206. The lawn mower 210 detects the wire 206 at the location 920. Thus, the lawn mower 210 recedes, to the turning location 930, toward the advancing direction 922 during a turning operation. The angle formed by the advancing direction 922 and the advancing direction 912 is, for example, approximately 180 degrees, but is not specifically limited.

Then, after turning at the turning location 930, the lawn mower 210 moves forward facing the advancing direction 1132 after turning. In one embodiment, the advancing direction determination section 834 determines the angle formed by the advancing direction 1132 and the advancing direction 912 based on any probability model. The advancing direction determination section 834 may determine the advancing direction 1132 such that the angle formed by the advancing direction 1132 and the advancing direction 912 satisfies a predetermined constraint condition. In another embodiment, for example, if the shape of the wire 206 is relatively simple, the advancing direction determination section 834 sets the angle formed by the advancing direction 1132 and the straight line 906 to approximately 0 degree or approximately 180 degrees.

Then, if the wire 206 is detected at the location 1140, the lawn mower 210 recedes, to the turning location 1150, toward the advancing direction 1142 during a turning operation in the manner similar to in the case in which the wire 206 is detected at the location 920. The angle formed by the advancing direction 1132 and the advancing direction 1142 is, for example, approximately 180 degrees, but is not specifically limited.

Then, after turning at the turning location 1150, the lawn mower 210 moves forward facing the advancing direction 1152 after turning. In one embodiment, the advancing direction determination section 834 determines the angle formed by the advancing direction 1152 and the advancing direction 1132 based on any probability model. The advancing direction determination section 834 may determine the advancing direction 1152 such that the angle formed by the advancing direction 1152 and the advancing direction 1132 satisfies a predetermined constraint condition. In another embodiment, for example, if the shape of the wire 206 is relatively simple, the advancing direction determination section 834 sets the angle formed by the advancing direction 1152 and the straight line 906 to approximately 0 degree or approximately 180 degrees.

In the embodiment described with reference to FIG. 9, FIG. 10, and FIG. 11, the advancing direction of the lawn mower 210 after turning has been determined relative to the extending direction of the straight line 906. However, the method to determine the advancing direction of the lawn mower 210 after turning is not limited to the present embodiment. In another embodiment, the orientation or direction indicating the advancing direction of the lawn mower 210 after turning is determined. In addition, the angle formed by the advancing direction before turning and the advancing direction after turning may be determined based on the orientation or direction indicating the advancing direction before turning and the orientation or direction indicating the advancing direction after turning.

In addition, in the embodiment described with reference to FIG. 9, FIG. 10, and FIG. 11, and the like, the detail of the turning operation has been described using, as an example, the case in which, upon the detection of the boundary, the lawn mower 210 recedes for a while and then turns. However, the turning operation is not limited to the present embodiment. In another embodiment, the lawn mower 210 may turn at the spot where the boundary was detected.

Figure 12:
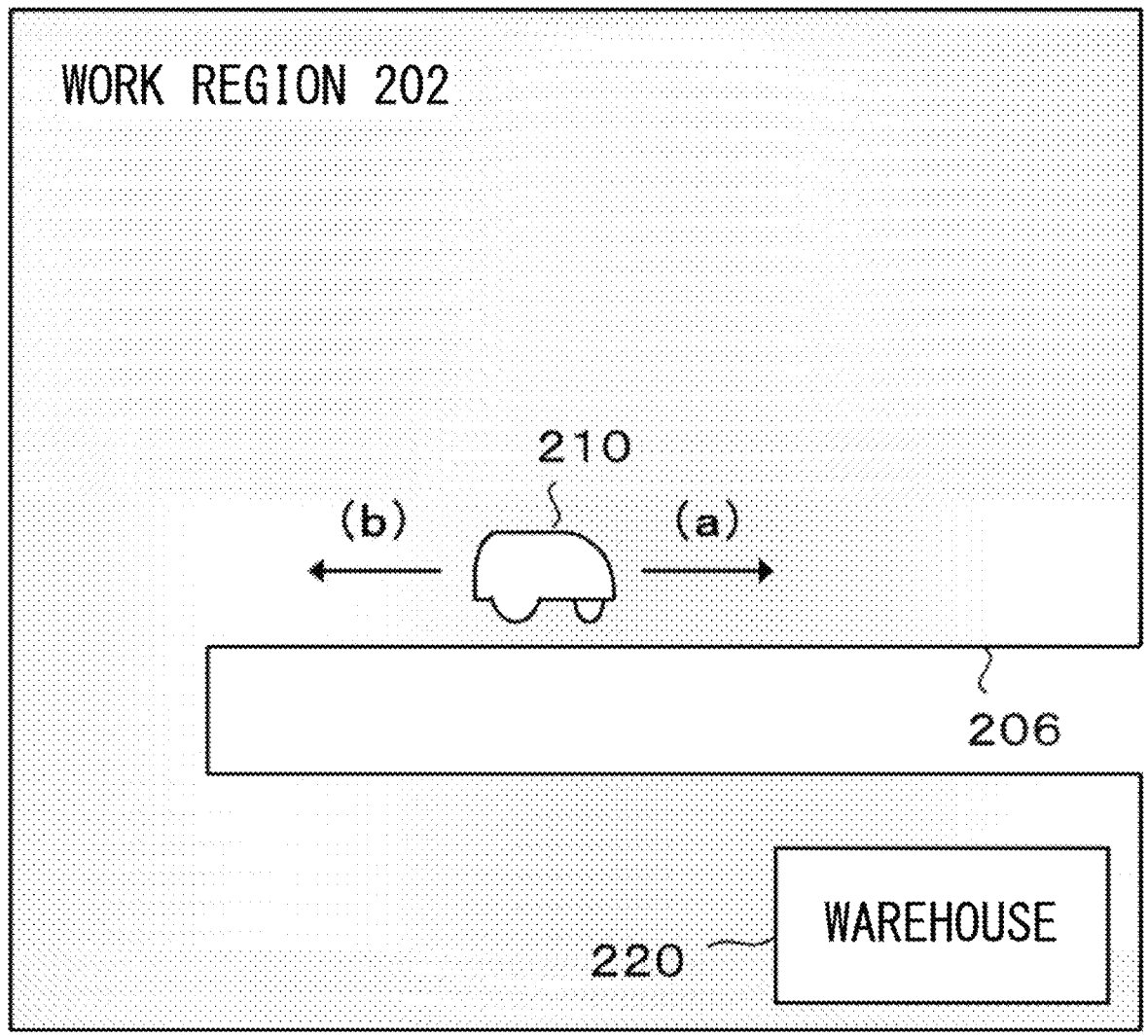
FIG. 12 schematically shows one example of a determination method of a return route of the lawn mower 210.

FIG. 12 schematically shows one example of the method to determine the return route of the lawn mower 210. In a case where the lawn mower 210 returns to the warehouse 220 along the wire 206, when the lawn mower 210 reaches the wire 206, the advancing direction determination section 834 selects one of the extending direction (a) and (b) of the wire 206 as the advancing direction of the lawn mower 210.

In this case, if the advancing direction determination section 834 selects the direction (a) as the advancing direction of the lawn mower 210 based on the location information of the lawn mower 210 and the location information of the warehouse 220, the direction may possibly cause an extreme detour depending on the location of the lawn mower 210 and the shape of the wire 206. Thus, according to the present embodiment, the advancing direction determination section 834 selects one of the extending directions (a) and (b) of the wire 206 as the advancing direction of the lawn mower 210 based on the location of the lawn mower 210 and the shape of the wire 206. Thereby, the lawn mower 210 can improve the moving efficiency.

Figure 13:
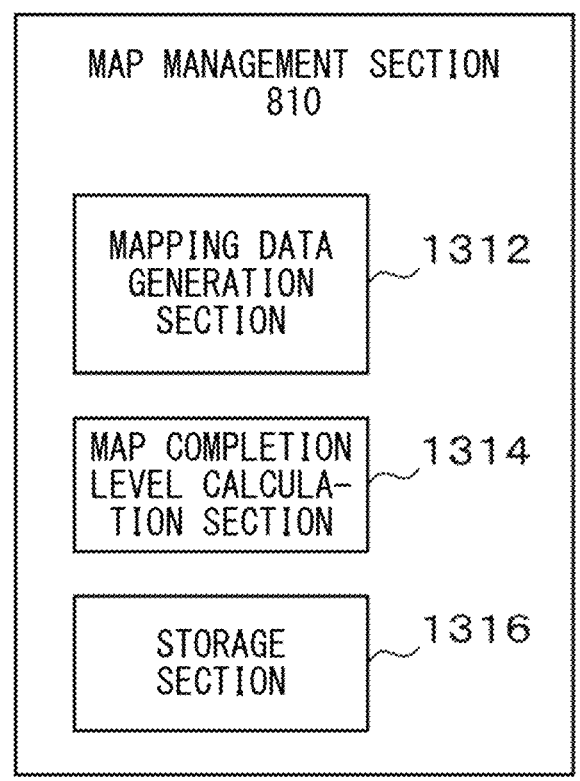
FIG. 13 schematically shows one example of the internal configuration of the map management section 810.

FIG. 13 schematically shows one example of the internal configuration of the map management section 810. In the present embodiment, the map management section 810 includes the mapping data generation section 1312, the map completion level calculation section 1314, and the storage section 1316.

In the present embodiment, the mapping data generation section 1312 obtains various types of log data via the input/output control section 740. The mapping data generation section 1312 may store the log data in the storage section 1316. The mapping data generation section 1312 generates the mapping data of the work region 202 based on a plurality of log data. The mapping data generation section 1312 may store the mapping data of the work region 202 in the storage section 1316.

In the present embodiment, the map completion level calculation section 1314 calculates the completion level of the mapping data of the work region 202. In one embodiment, the map completion level calculation section 1314 calculates the completion level of the mapping data for each sub-region included in the work region 202. In another embodiment, the map completion level calculation section 1314 calculates the completion level of the mapping data for each location of the lawn mower 210. In response to the request from the map completion level obtaining section 826, the map completion level calculation section 1314 may (i) obtain the information indicating the completion level of the mapping data in the location indicated by the request and (ii) transmit the information to the map completion level obtaining section 826.

Figure 14:
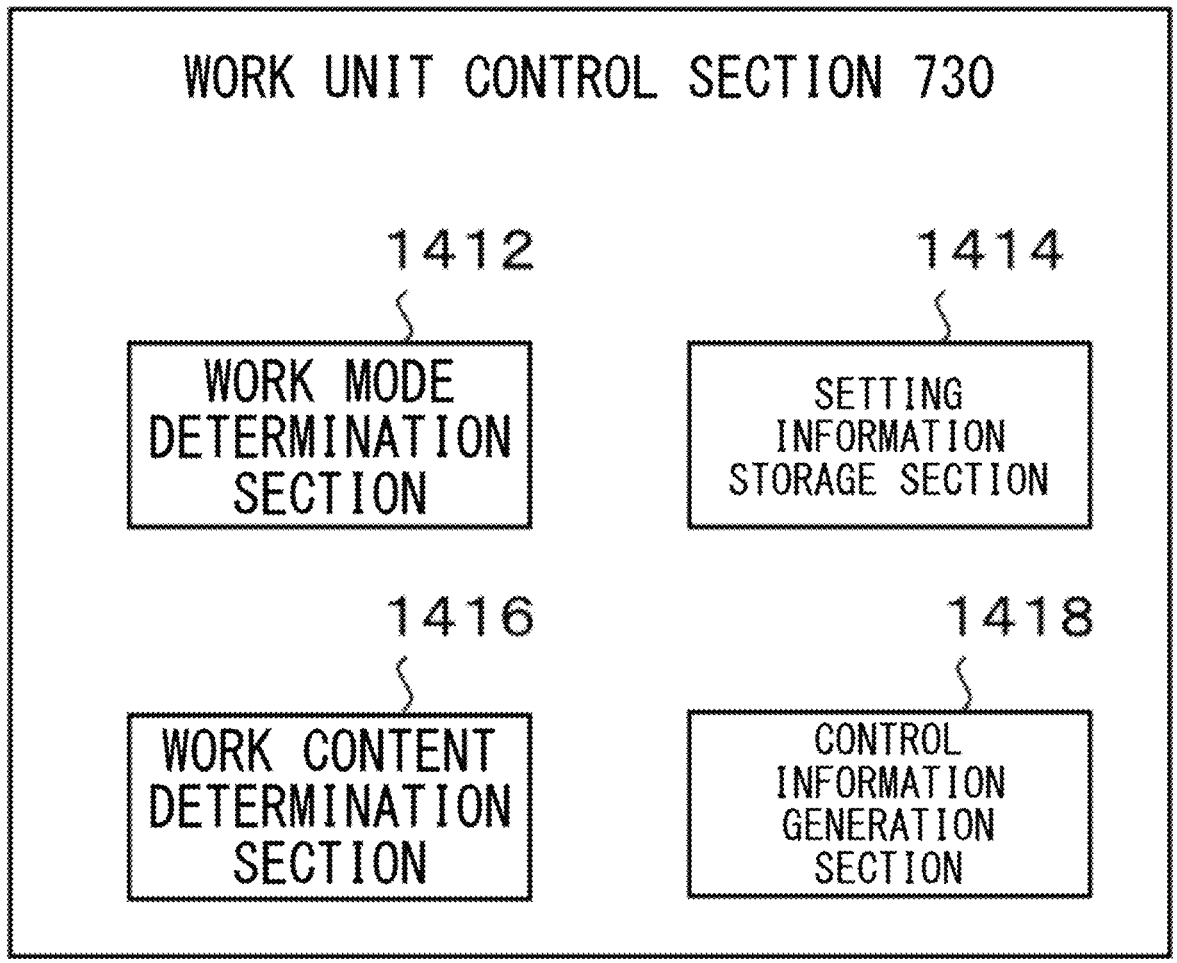
FIG. 14 schematically shows one example of the internal configuration of the work unit control section 730.

FIG. 14 schematically shows one example of the internal configuration of the work unit control section 730. In the present embodiment, the work unit control section 730 includes the work mode determination section 1412, the setting information storage section 1414, the work content determination section 1416, and the control information generation section 1418.

In the present embodiment, the work mode determination section 1412 determines the work mode of the work unit 620. The work mode determination section 1412 in motion may determine whether to perform the work. The work mode determination section 1412 may determine the work mode of the work unit 620 based on, for example, the movement mode determined by the travel control section 720.

In the present embodiment, the setting information storage section 1414 stores setting information for each of one or more work modes. The setting information may be the information which associates the identification information of each work mode and the information which defines the content of the work in the work mode.

The work mode defines, for example, at least one of (i) whether the work can be performed and (ii) the work intensity. Examples of the work mode include (i) a mode in which a work is performed during a moving period, (ii) a mode in which a work is stopped or suspended during a moving period, (iii) a mode in which a work is performed during a straight moving period, but a work is stopped or suspended during a turning operation, and the like.

Another example of the work mode includes (i) a mode in which the work intensity is relatively large, (ii) a mode in which the work intensity is moderate, (iii) a mode in which the work intensity is relatively small, and the like. Other examples of the work mode include (iv) the mode to return to the warehouse 220, (v) the mode to move from the warehouse 220 to the location where the work of interest is started, and the like.

Examples of the work intensity include the work frequency in a particular period, the workload per work, the total workload in a particular period, and the like. The work intensity may be represented with consecutive numerical values or may be represented with a stepwise segmentation. Each segment may be distinguished with symbols or characters, or may be distinguished with numbers.

In the present embodiment, the work content determination section 1416 determines the content of the work performed by the work unit 620. Examples of the content of work include the target of the work, the type of the work, the intensity of the work, and the like.

In the present embodiment, the control information generation section 1418 generates the control information to control the work unit 620. The control information generation section 1418 may generate the control signal indicating at least one of the timing when the work unit 620 starts the work, the timing when the work unit 620 stops the work, and the like. The control information generation section 1418 may generate the control information indicating the content of the work.

In the present embodiment, the case in which the work unit control section 730 is arranged on the lawn mower 210 has been described. However, the work unit control section 730 is not limited to the present embodiment. In another embodiment, the work unit control section 730 may be arranged on the management server 230. A part of the work unit control section 730 may be arranged on the management server 230.

FIG. 15 schematically shows one example of the data table 1500. The data table 1500 may be one example of the data structure of the log data. In the present embodiment, the data table 1500 stores and associates the information indicating the time, the information indicating the location of the lawn mower 210, the information indicating the posture of the lawn mower 210, the information indicating whether the boundary is detected, the information indicating whether the proximity to the obstacle is detected, the information indicating the state of the ground, the information indicating the detail of the work performed by the lawn mower 210.

In the present embodiment, the information indicating the location of the lawn mower 210 includes the information indicating the location coordinate of the lawn mower 210 and the information indicating the positioning precision. The location coordinate may be, for example, the information which can identify a location inside the work region 202, and the method to represent the coordinate of the location is not specifically limited. The location coordinate may be the two dimension coordinate or three dimension coordinate. In the present embodiment, the information indicating the posture of the lawn mower 210 includes the information indicating each of the roll, pitch, and yaw of the lawn mower 210. The information indicating the posture of the lawn mower 210 may be two dimension information or may be three dimension information.

In the present embodiment, the information indicating whether the boundary has been detected may include the output data of the boundary detection unit 662. In the present embodiment, the information indicating whether the proximity to an obstacle is detected may include the output data of the proximity detection unit 664. The information indicating whether the proximity to an obstacle is detected may include the output data of the distance measurement unit 666.

In the present embodiment, the information indicating the state of the ground may be the information indicating the presence or absence of the step, dip, and the like formed on the ground. The information indicating the state of the ground may include the output data of the distance measurement unit 666. The information indicating the state of the ground may be the information indicating the degree of muddiness on the ground, the degree of slipperiness on the ground, and the like. The information indicating the state of the ground includes the information indicating the current value of the drive current for the travel motor 616. In the present embodiment, the information indicating the detail of the work may be the information indicating whether the lawn mower 210 is performing the work, the work mode, the content of the work, the state of the work target, the attribute of the work target, and the like.

The data table 1500 is not limited to the present embodiment. In another embodiment, the data table 1500 may associate and store (i) the information indicating the location of the lawn mower 210 and (ii) at least one of the information indicating the time, the information indicating the posture of the lawn mower 210, the information indicating whether the boundary has been detected, the information indicating whether the proximity to the obstacle has been detected, the information indicating the state of the ground, and the information indicating the detail of the work performed by the lawn mower 210.

FIG. 16 schematically shows one example of the data table 1600. The data table 1600 may be one example of the data structure of the mapping data. In the present embodiment, the data table 1600 associates and stores the information indicating a location, the identification information of the unit region including the location, and the information indicating the evaluation in the location.

In the present embodiment, the information indicating a location may include the information indicating the location coordinate of the location. The location coordinate may be, for example, the information which can identify a location inside the work region 202, and the method to represent the location coordinate is not specifically limited. The location coordinate may be two dimension coordinate or three dimension coordinate. In the present embodiment, the information indicating the evaluation includes at least one of the information indicating the evaluation related to whether the entrance is permitted or prohibited, the information indicating the evaluation related to the attribute of the work target, and the information indicating the evaluation related to the positioning precision.

The data table 1600 is not limited to the present embodiment. In another embodiment, the data table 1600 may associate and store the information indicating a location and the information indicating whether the entrance is permitted or prohibited in the location.

Figure 17:
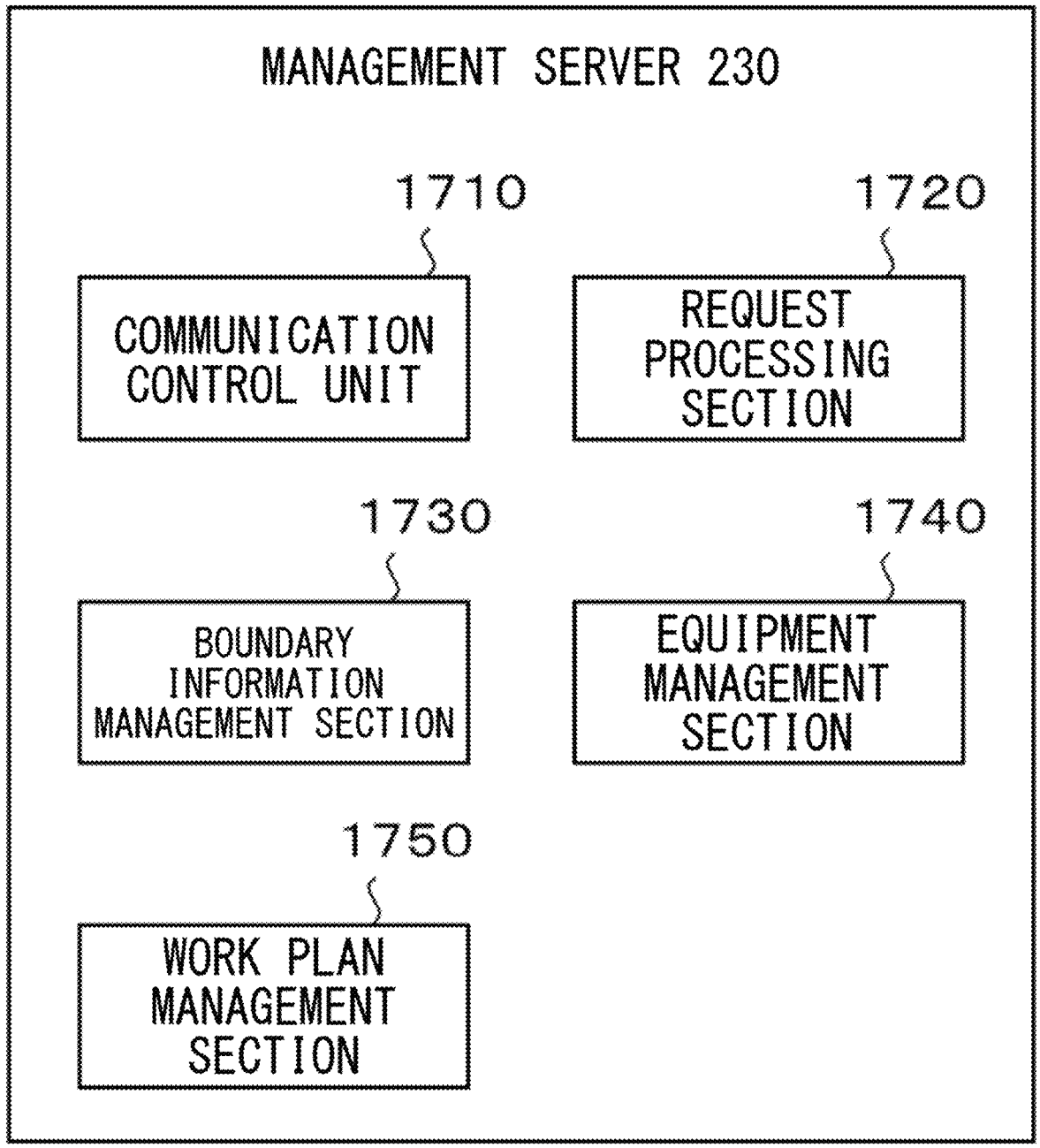
FIG. 17 schematically shows one example of the internal configuration of the management server 230.

FIG. 17 schematically shows one example of the internal configuration of the management server 230. In the present embodiment, the management server 230 includes the communication control unit 1710, the request processing section 1720, the boundary information management section 1730, the equipment management section 1740, and the work plan management section 1750.

In the present embodiment, the communication control section 1710 controls communication with the equipment outside the management server 230. The communication control section 1710 may be a communication interface compatible with one or more communication scheme. Examples of the external equipment include the user terminal 22, the lawn mower 210, the charging station 222, and the like. In the present embodiment, the request processing section 1720 accepts the request from the external equipment. The request processing section 1720 processes the request form the external equipment.

In the present embodiment, the boundary information management section 1730 manages the information related to the boundary of the work region 202. The boundary information management section 1730 may store the information indicating the location, size, and range or shape of the wire 206. The information indicating the location, size, and range or shape of one or more boundary included in the work region 202 may be stored. The boundary information management section 1730 may obtain the mapping data from the map management section 810. The boundary information management section 1730 may have a configuration similar to that of the map management section 810.

In the present embodiment, the equipment management section 1740 manages various types of equipment which configure the management system 200. For example, the equipment management section 1740 manages the information related to at least one of the lawn mower 210, the warehouse 220, and the charging station 222. The equipment management section 1740 may manage the information related to the location, the advancing speed, the advancing direction, the movement mode, the work mode and the like of the lawn mower 210.

In the present embodiment, the work plan management section 1750 manages the schedule of the work performed by the lawn mower 210. The work plan management section 1750 may plan the work schedule of the lawn mower 210. The work plan management section 1750 may manage the work schedule of the lawn mower 210.

While the embodiments of the present invention have been described, the technical scope of the invention is not limited to the above described embodiments. It is apparent to persons skilled in the art that various alterations and improvements can be added to the above-described embodiments. Also, unless a technical contradiction occurs, the matters described in the particular embodiment can be applied to another embodiment. For example, what is described for an embodiment of the FIG. 1 can be applied to another embodiment described with reference to another drawing. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 20 communication network, 22 user terminal, 100 region, 106 boundary, 110 entrance prohibiting region, 116 boundary, 120 obstacle, 130 sub-region, 136 boundary, 140 sub-region, 146 boundary, 150 moving object, 152 control apparatus, 154 control section, 200 management system, 202 work region, 204 non-work region, 206 wire, 210 lawn mower, 220 warehouse, 222 charging station, 230 management server, 302 passage, 330 protection target, 340 protected region setting apparatus, 350 protected region, 356 boundary, 402 sub-region, 403 sub-region, 404 sub-region, 405 sub-region, 406 sub-region, 407 sub-region, 420 map, 440 judgement process section, 520 map, 602 housing, 612 front wheel, 614 rear wheel, 616 travel motor, 620 work unit, 622 blade disk, 624 cutter blade, 626 work motor, 628 shaft, 630 location adjustment section, 640 battery unit, 650 user interface, 662 boundary detection unit, 664 proximity detection unit, 666 distance measurement unit, 670 sensor unit, 680 control unit, 710 communication control section, 720 travel control section, 730 work unit control section, 740 input/output control section, 810 map management section, 822 location estimation section, 824 location precision obtaining section, 826 map completion level obtaining section, 830 travel mode determination section, 832 advancing speed determination section, 834 advancing direction determination section, 836 control information generation section, 840 setting information storage section, 902 point, 904 point, 906 straight line, 912 advancing direction, 920 location, 922 advancing direction, 930 turning location, 932 advancing direction, 940 turning location, 942 advancing direction, 1032 advancing direction, 1132 advancing direction, 1140 location, 1142 advancing direction, 1150 turning location, 1152 advancing direction, 1312 mapping data generation section, 1314 map completion level calculation section, 1316 storage section, 1412 work mode determination section, 1414 setting information storage section, 1416 work content determination section, 1418 control information generation section, 1500 data table, 1600 data table, 1710 communication control unit, 1720 request processing section, 1730 boundary information management section, 1740 equipment management section, 1750 work plan management section

What is claimed is:

1. A control apparatus to control a moving object, the moving object having an autonomous movement function, the control apparatus comprising:
 a control section to control a movement of the moving object based on a completion level of a map, the map including a plurality of regions and indicating information on whether or not the moving object is permitted to enter each of the plurality of regions, wherein the completion level of the map is defined as a ratio of regions, among the plurality of regions, in which creating or updating the information is ended, relative to a whole of the plurality of regions.

2. The control apparatus according to claim 1, wherein the control section controls a movement of the moving object such that at least one of (i) an advancing speed of the moving object and (ii) an operation performed when the moving object reaches a boundary of the region are different between (a) in a case where a completion level of the map information at a location of the moving object satisfies a predetermined first condition and (b) in a case where a completion level of the map information at a location of the moving object satisfies a predetermined second condition.

3. The control apparatus according to claim 2, wherein the second condition is a condition that a completion level of the map information does not satisfy the first condition.

4. The control apparatus according to claim 2, wherein if a completion level of the map information at a location of the moving object satisfies the first condition, the control section:
(i) sets a set value of an advancing speed of the moving object to a smaller value relative to a case in which a completion level of the map information satisfies the second condition, and
(ii) determines an advancing direction of the moving object based on a probability model when the moving object reaches a boundary of the region.

5. The control apparatus according to claim 2, wherein if a completion level of the map information at a location of the moving object satisfies the first condition, the control section controls a movement of the moving object such that the moving object returns to a return destination of the moving object.

6. The control apparatus according to claim 1, wherein the control section estimates a location of the moving object based on a GPS signal received by the moving object and controls a movement of the moving object based on a location estimation precision of the moving object in accordance with a positioning precision included in the GPS signal, and
the control section controls a movement of the moving object such that at least one of (i) an advancing speed of the moving object and (ii) an operation performed when the moving object reaches a boundary of the region are different between (a) in a case where a location estimation precision of the moving object satisfies a predetermined third condition and (b) in a case where a location estimation precision of the moving object satisfies a predetermined fourth condition.

7. The control apparatus according to claim 6, where the fourth condition is a condition that a location estimation precision of the moving object does not satisfy the third condition.

8. The control apparatus according to claim 6, wherein if a location estimation precision of the moving object satisfies the third condition, the control section:
(i) sets a set value of an advancing speed of the moving object to a smaller value relative to a case where a location estimation precision of the moving object satisfies the fourth condition, and
(ii) determines an advancing direction of the moving object based on a probability model when the moving object reaches a boundary of the region.

9. The control apparatus according to claim 6, wherein if a location estimation precision of the moving object satisfies the third condition, the control section controls a movement of the moving object such that the moving object returns to a return destination of the moving object.

10. The control apparatus according to claim 6, wherein the third condition and the fourth condition are defined as either one of (i) the third condition is a condition that the location estimation precision is equal to or lower than a predetermined threshold and the fourth condition is a condition that the location estimation precision is larger than the predetermined threshold or (ii) the third condition is a condition that the location estimation precision is lower than a predetermined threshold and the fourth condition is a condition that the location estimation precision is equal to or larger than the predetermined threshold.

11. The control apparatus according to claim 1, wherein a calculation region is set around the moving object when a location of the moving object is specified, and
the completion level of the map is determined based on at least one of (i) a number of log data that has been already obtained inside the calculation region, (ii) a geographic distribution of the log data that has been already obtained inside the calculation region, (iii) a shortest distance between a location indicated by the log data that has been already obtained inside the calculation region and the location of the moving object, and (iv) a ratio of an area of a region through which the moving object has already passed inside the calculation region to an area of the calculation region.

12. The control apparatus according to claim 1, wherein if the completion level of the map at a location of the moving object satisfies a predetermined first condition, the control section is configured to:
(i) sets a set value of an advancing speed of the moving object to a smaller value relative to a case in which the completion level of the map does not satisfy the first condition, and
(ii) determines an advancing direction of the moving object based on a probability model when the moving object reaches a boundary between the plurality of regions, and
the first condition includes a condition that the completion level of the map is smaller than or equal to a predetermined threshold.

13. The control apparatus according to claim 1, wherein among the plurality of regions, one or more regions, in which log data has not been obtained and which are entirely surrounded by regions where the moving object is not permitted to enter, are excluded from the whole of the plurality of regions in defining the completion level of the map.

14. A work machine which autonomously travels, comprising the control apparatus according to claim 1.

15. A non-transitory computer readable storage medium which stores a program of a control apparatus which controls a moving object having an autonomous movement function, wherein
the program enables a computer to perform a control procedure to control a movement of the moving object based on a completion level of a map, the map including a plurality of regions and indicating information on whether or not the moving object is permitted to enter each of the plurality of regions, wherein the completion level of the map is defined as a ratio of regions, among the plurality of regions, in which creating or updating the information is ended, relative to a whole of the plurality of regions.

16. The non-transitory computer readable storage medium according to claim 15, wherein
a calculation region is set around the moving object when a location of the moving object is specified, and
the completion level of the map is determined based on at least one of (i) a number of log data that has been already obtained inside the calculation region, (ii) a geographic distribution of the log data that has been already obtained inside the calculation region, (iii) a shortest distance between a location indicated by the log data that has been already obtained inside the calculation region and the location of the moving object, and (iv) a ratio of an area of a region through which the moving object has already passed inside the calculation region to an area of the calculation region.

17. A control method to control a moving object having an autonomous movement function, comprising:
controlling a movement of the moving object based on a completion level of a map, the map including a plurality of regions and indicating information on whether or not the moving object is permitted to enter each of the plurality of regions, wherein
the completion level of the map is defined as a ratio of regions, among the plurality of regions, in which creating or updating the information is ended, relative to a whole of the plurality of regions.

18. The control method according to claim 17, wherein
a calculation region is set around the moving object when a location of the moving object is specified, and
the completion level of the map is determined based on at least one of (i) a number of log data that has been already obtained inside the calculation region, (ii) a geographic distribution of the log data that has been already obtained inside the calculation region, (iii) a shortest distance between a location indicated by the log data that has been already obtained inside the calculation region and the location of the moving object, and (iv) a ratio of an area of a region through which the moving object has already passed inside the calculation region to an area of the calculation region.

\* \* \* \* \*